US012107332B2

(12) United States Patent
Chang et al.

(10) Patent No.: US 12,107,332 B2
(45) Date of Patent: Oct. 1, 2024

(54) ELECTROMAGNETIC WAVE REFLECTARRAY

(71) Applicant: TMY Technology Inc., Taipei (TW)

(72) Inventors: Su-Wei Chang, Taipei (TW); Sheng-Fuh Chang, Chiayi (TW); Chia-Chan Chang, Chiayi (TW); Shih-Cheng Lin, Taitung County (TW); Yuan-Chun Lin, Hsinchu County (TW)

(73) Assignee: TMY Technology Inc., Taipei (TW)

( * ) Notice: Subject to any disclaimer, the term of this patent is extended or adjusted under 35 U.S.C. 154(b) by 224 days.

(21) Appl. No.: 17/885,558

(22) Filed: Aug. 11, 2022

(65) Prior Publication Data

US 2022/0384961 A1 Dec. 1, 2022

Related U.S. Application Data

(63) Continuation-in-part of application No. 17/171,342, filed on Feb. 9, 2021, now Pat. No. 11,777,225.

(60) Provisional application No. 63/254,537, filed on Oct. 12, 2021.

(30) Foreign Application Priority Data

Dec. 28, 2021 (TW) ................................ 110149202

(51) Int. Cl.
*H01Q 15/14* (2006.01)
*H01Q 3/46* (2006.01)

(52) U.S. Cl.
CPC ............ *H01Q 15/148* (2013.01); *H01Q 3/46* (2013.01)

(58) Field of Classification Search
CPC .......... H01Q 15/0013; H01Q 15/0026; H01Q 15/148; H01Q 3/46
See application file for complete search history.

(56) References Cited

U.S. PATENT DOCUMENTS

| | | | |
|---|---|---|---|
| 8,223,423 | B2 | 7/2012 | Haberfelde et al. |
| 10,490,903 | B2 | 11/2019 | Foo |
| 10,720,712 | B2 | 7/2020 | Foo |
| 2010/0328186 | A1 | 12/2010 | Kanno |
| 2016/0359234 | A1 | 12/2016 | Bily et al. |

(Continued)

FOREIGN PATENT DOCUMENTS

| | | |
|---|---|---|
| CN | 108598631 | 9/2018 |
| CN | 110957585 | 4/2021 |

(Continued)

*Primary Examiner* — Hoang V Nguyen
*Assistant Examiner* — Amal Patel
(74) *Attorney, Agent, or Firm* — JCIPRNET

(57) ABSTRACT

Provided is an electromagnetic wave reflectarray, including a first substrate, a second substrate, first wires and second wires respectively arranged on the first substrate and the second substrate along a first direction and a second direction, antenna electrodes and tuning electrodes respectively arranged into first electrode strings and second electrode strings electrically connected to the first wires and the second wires on the first substrate and the second substrate along the first direction, and a liquid crystal layer disposed between the first substrate and the second substrate. The tuning electrodes completely cover the orthographic projections of the antenna electrodes on the second substrate.

23 Claims, 18 Drawing Sheets

(56) References Cited

U.S. PATENT DOCUMENTS

| | | | | |
|---|---|---|---|---|
| 2018/0083364 | A1 | 3/2018 | Foo | |
| 2018/0316090 | A1* | 11/2018 | Foo | H01Q 15/002 |
| 2019/0146248 | A1 | 5/2019 | Wang et al. | |
| 2020/0381824 | A1 | 12/2020 | Kao et al. | |
| 2024/0039156 | A1* | 2/2024 | Suzuki | B32B 27/308 |

FOREIGN PATENT DOCUMENTS

| | | |
|---|---|---|
| CN | 113131224 | 7/2021 |
| JP | 2016512408 | 4/2016 |
| JP | 2019530387 | 10/2019 |
| TW | 201522074 | 6/2015 |
| WO | 2010073486 | 7/2010 |
| WO | 2012080532 | 6/2012 |

* cited by examiner

ELECTROMAGNETIC WAVE REFLECTARRAY

CROSS-REFERENCE TO RELATED APPLICATION

This application is a continuation-in-part application of and claims the priority benefit of U.S. application Ser. No. 17/171,342, filed on Feb. 9, 2021, which claims the priority benefit of Taiwan application serial no. 109125161, filed on Jul. 24, 2020. This application also claims the priority benefit of U.S. provisional application Ser. No. 63/254,537, filed on Oct. 12, 2021, and Taiwan application serial no. 110149202, filed on Dec. 28, 2021. The entirety of each of the above-mentioned patent applications is hereby incorporated by reference herein and made a part of this specification.

BACKGROUND

Technology Field

The disclosure relates to an electromagnetic wave reflectarray, and more particularly to an electromagnetic wave reflectarray with adjustable electromagnetic wave transceiving direction and resonance frequency.

Description of Related Art

Reduction of energy loss of electromagnetic waves in a transmission path has long been an important topic in mobile communication. With increasingly higher frequency of electromagnetic waves used, the energy loss generated becomes greater when the waves encounter obstacles (such as concrete walls, trees, furniture, signboards, and the like). Therefore, communication dead zones, black spots, or areas of poor signal coverage are prone to be generated in application spaces.

The above problem may be better handled by deploying base stations or boosters, but the construction, the energy consumption, and the subsequent hardware maintenance thereof all incur considerable costs. Hence, a reflectarray is widely used to increase electromagnetic wave signal coverage to solve the above problem. However, due to the fixed antenna size of the reflective antenna array, the electromagnetic wave transceiving direction cannot be adjusted according to the construction environment, which causes inconvenience in use.

SUMMARY

The disclosure provides an electromagnetic wave reflectarray with adjustable electromagnetic wave transceiving direction and resonance frequency.

An electromagnetic wave reflectarray of the disclosure includes a first substrate, a second substrate, multiple first wires, multiple second wires, multiple antenna electrodes, multiple tuning electrodes, and a liquid crystal layer. The second substrate is disposed opposite to the first substrate. The first wires are arranged on the first substrate along a first direction and extend in a second direction. The first direction intersects with the second direction. The second wires are arranged on the second substrate along the second direction and extend in the first direction. The antenna electrodes are disposed on the first substrate and are respectively arranged into multiple first electrode strings along the first direction. The first electrode strings are respectively electrically connected to the first wires. The tuning electrodes are disposed on the second substrate, respectively overlaying and completely covering the orthographic projections of the antenna electrodes on the second substrate. The tuning electrodes are respectively arranged into multiple second electrode strings along the first direction, and the second electrode strings are respectively electrically connected to the second wires. The liquid crystal layer is disposed between the first substrate and the second substrate.

In an embodiment of the disclosure, the first wires of the electromagnetic wave reflectarray are electrically connected to a first voltage source to have a first voltage. The second wires are electrically connected to a second voltage source to have a second voltage.

In an embodiment of the disclosure, the first wire of the electromagnetic wave reflectarray has multiple first resistors located between the antenna electrodes, and these first resistors are respectively electrically connected to any two antenna electrodes in the first electrode string.

In an embodiment of the disclosure, the second wire of the electromagnetic wave reflectarray has multiple second resistors located between the antenna electrodes, and these second resistors are respectively electrically connected to any two tuning electrodes in the second electrode string.

In an embodiment of the disclosure, the first wires or the second wires of the electromagnetic wave reflectarray respectively have different voltages.

In an embodiment of the disclosure, in the electromagnetic wave reflectarray, the first wires are electrically connected to a first digital-to-analog converter array to have different voltages respectively, and the second wires are electrically connected to a second digital-to-analog converter array to have different voltages respectively.

In an embodiment of the disclosure, in the electromagnetic wave reflectarray, the voltage of each first wire increases or decreases from one side to the other side of the first wires in the first direction, and the voltage of each second wire increases or decreases from one side to the other side of the second wires in the second direction.

In an embodiment of the disclosure, each antenna electrode of the electromagnetic wave reflectarray has a first width and a second width respectively along the first direction and the second direction. The first width of each antenna electrode is the same, and the second width of each antenna electrode is the same.

In an embodiment of the disclosure, the width of each antenna electrode of the electromagnetic wave reflectarray along a third direction increases or decreases from one side to the other side of the antenna electrodes in the third direction.

In an embodiment of the disclosure, the third direction of the electromagnetic wave reflectarray is parallel to one of the first direction and the second direction.

In an embodiment of the disclosure, the width of each antenna electrode of the electromagnetic wave reflectarray along a fourth direction increases or decreases from one side to the other side of the antenna electrodes in the fourth direction, and the fourth direction is not parallel to the first direction and the second direction.

In an embodiment of the disclosure, each tuning electrode of the electromagnetic wave reflectarray has the same width along the third direction.

In an embodiment of the disclosure, each tuning electrode of the electromagnetic wave reflectarray has a bottom portion parallel to the second substrate and a sidewall portion bendably extending from the bottom portion. The liquid crystal layer is divided into multiple portions separated from each other, and the sidewall portion of each tuning electrode surrounds one portion of the liquid crystal layer and one antenna electrode.

In an embodiment of the disclosure, each antenna electrode of the electromagnetic wave reflectarray includes at least one conductor patch, and the profile of the orthographic projection of the at least one conductor patch on the first substrate is circular, rectangular, annular, U-shaped, or L-shaped.

In an embodiment of the disclosure, the orthographic projection of each antenna electrode of the electromagnetic wave reflectarray on the second substrate is completely covered by the orthographic projection of one tuning electrode on the second substrate.

In an embodiment of the disclosure, the electromagnetic wave reflectarray further includes at least one alignment layer disposed between the liquid crystal layer and at least one of the first substrate and the second substrate.

In an embodiment of the disclosure, the at least one alignment layer of the electromagnetic wave reflectarray is multiple alignment patterns disposed in correspondence to the tuning electrodes, and profiles of orthographic projections of each alignment pattern and each tuning electrode on the first substrate are the same.

In an embodiment of the disclosure, the alignment direction of each alignment pattern of the electromagnetic wave reflectarray is radial or concentric.

Based on the above, in the electromagnetic wave reflectarray of an embodiment of the disclosure, each of the antenna structures arranged into an array has the antenna electrode, the tuning electrode, and the liquid crystal layer located between the two electrodes. By adjusting the effective dielectric constant distribution of the liquid crystal layer in these antenna structures, the radiation pattern or reflection efficiency of electromagnetic waves after reflected by these antenna structures may be changed.

DESCRIPTION OF THE EMBODIMENTS

Figure 1:
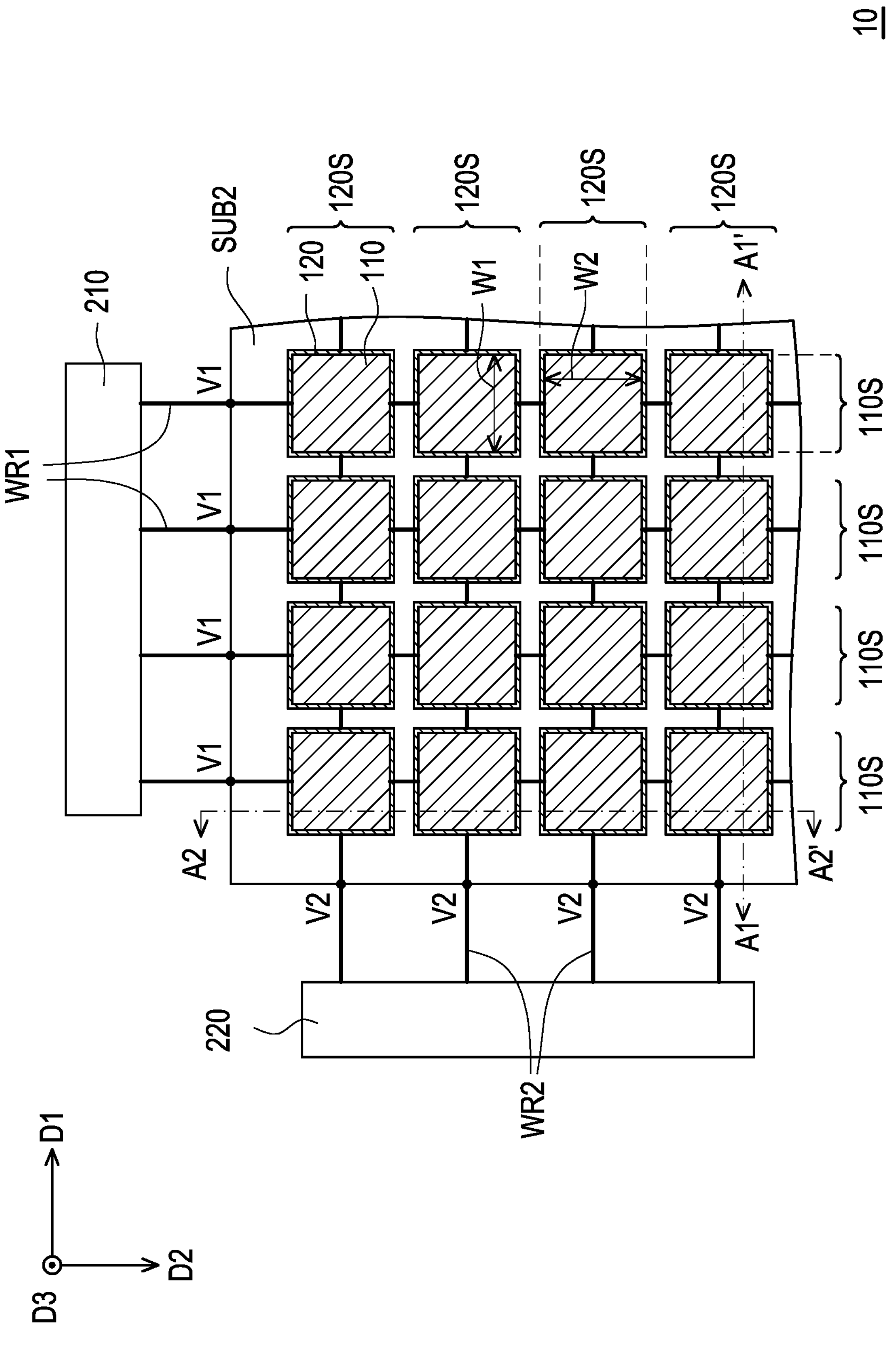
FIG. 1 is a schematic top view of an electromagnetic wave reflectarray according to the first embodiment of the disclosure.

The usages of "approximately," "similar to," "essentially," or "substantially" indicated throughout the specification include the indicated value and an average value having an acceptable deviation range, which is a certain value confirmed by people skilled in the art, and is a certain amount considered the discussed measurement and measurement-related deviation (i.e., the limitation of measurement system). For example, "approximately" may indicate to be within one or more standard deviations of the indicated value, such as being within ±30%, ±20%, ±15%, ±10%, or ±5%. Furthermore, the usages of "approximately," "similar to," "essentially," or "substantially" indicated throughout the specification may refer to a more acceptable deviation scope or standard deviation depending on measurement properties, cutting properties, or other properties, and all properties may not be applied with one standard deviation.

In the drawings, for clarity, the thickness of layers, films, plates, areas, and the like are magnified. It should be understood that when an element such as a layer, a film, an area, or a substrate is indicated to be "on" another element or "connected to" another element, it may be directly on another element or connected to another element, or an element in the middle may exist. In contrast, when an element is indicated to be "directly on another element" or "directly connected to" another element, an element in the middle does not exist. As used herein, "to connect" may indicate to physically and/or electrically connect. Furthermore, "electrically connected" may also be used when other elements exist between two elements.

References of the exemplary embodiments of the disclosure are to be made in detail. Examples of the exemplary embodiments are illustrated in the drawings. If applicable, the same reference numerals in the drawings and the descriptions indicate the same or similar parts.

Figure 2A:
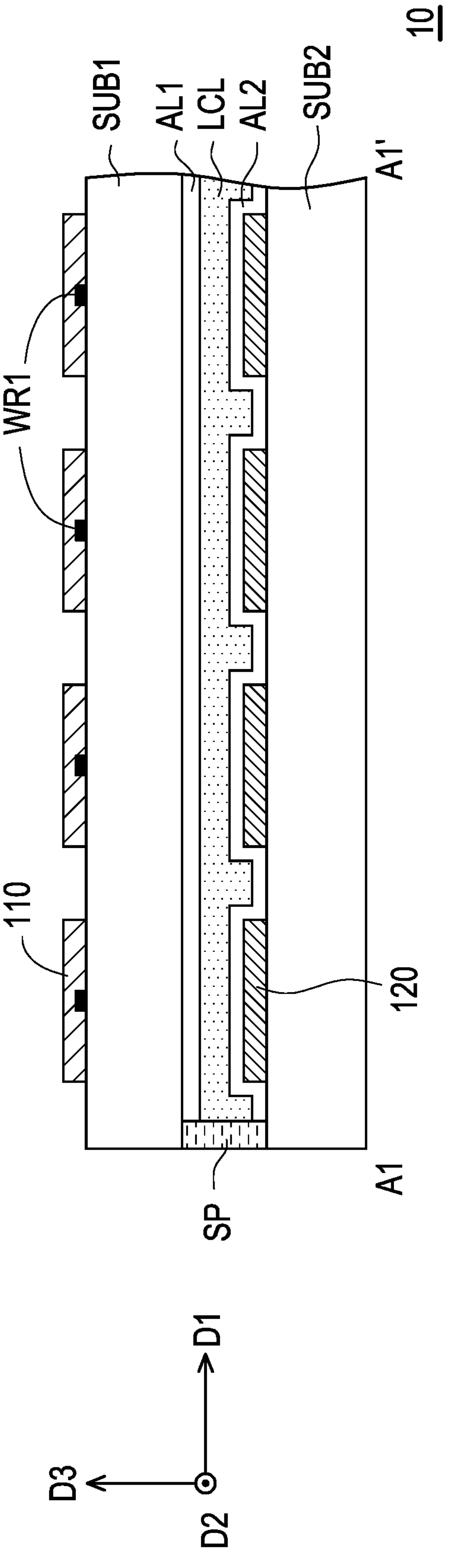
FIG. 2A and FIG. 2B are schematic cross-sectional views of the electromagnetic wave reflectarray in FIG. 1.
Figure 2B:
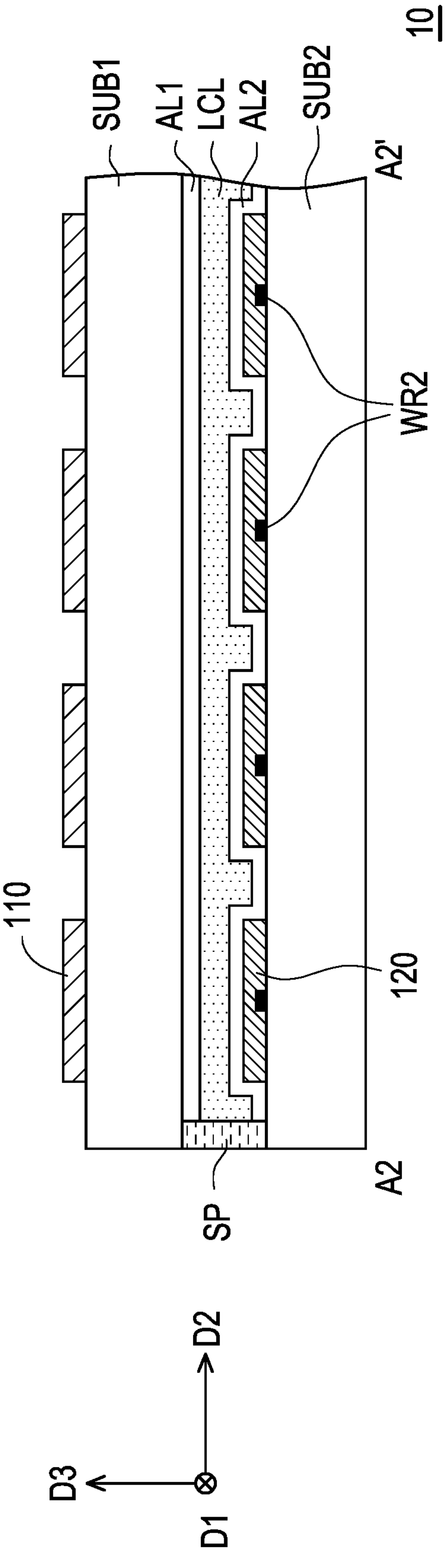
Figure 3:
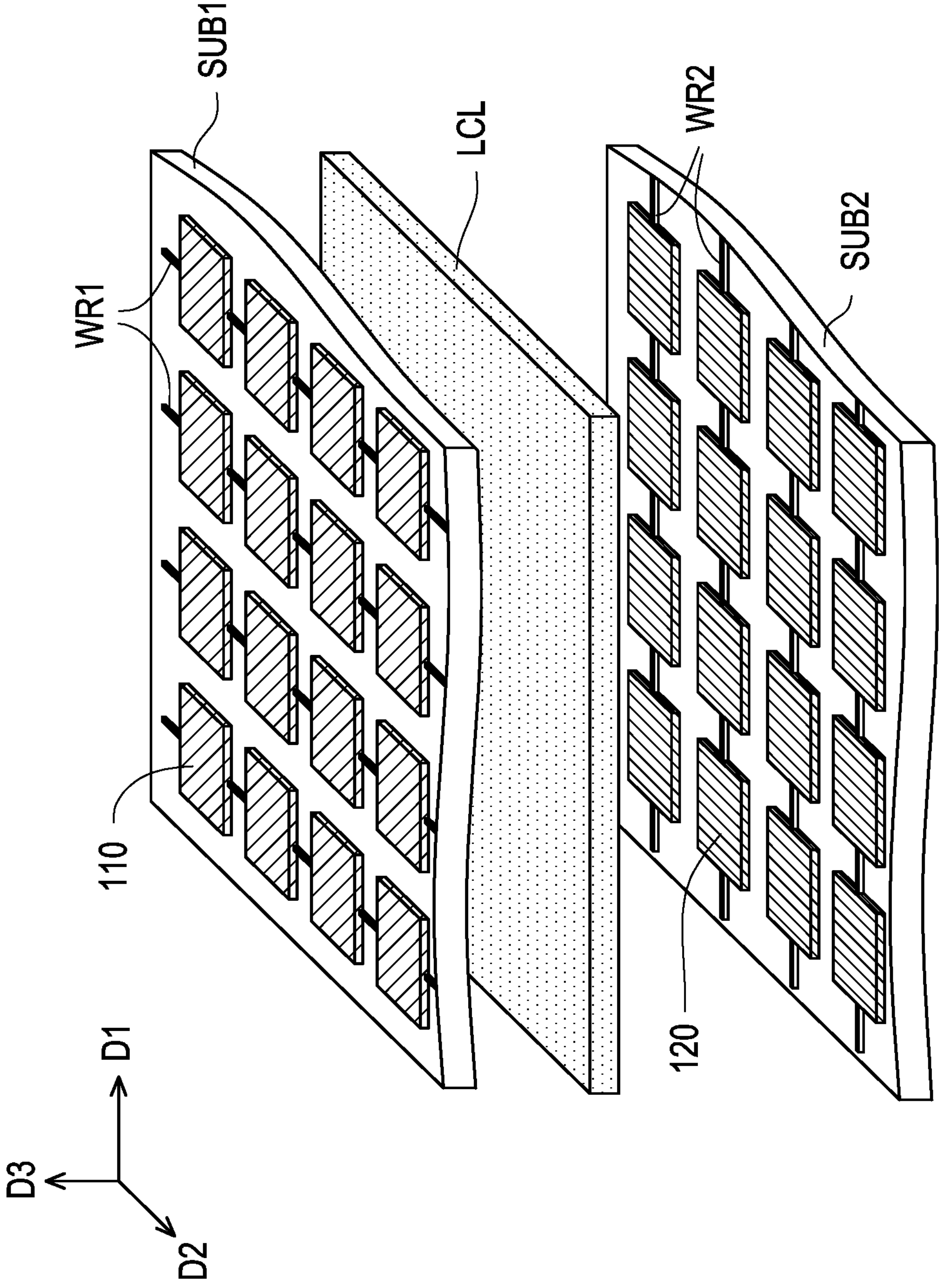
FIG. 3 is a schematic exploded view of a part of layers of the electromagnetic wave reflectarray in FIG. 1.
Figure 4C:
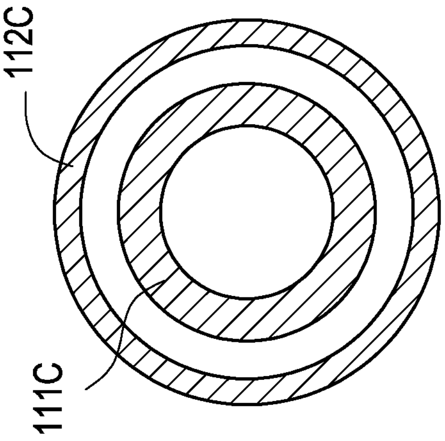
FIG. 4A to FIG. 4F are schematic top views of antenna electrodes according to some modified embodiments of the disclosure.

FIG. 1 is a schematic top view of an electromagnetic wave reflectarray according to the first embodiment of the disclosure. FIG. 2A and FIG. 2B are schematic cross-sectional views of the electromagnetic wave reflectarray in FIG. 1 respectively taken alone a section line A1-A1' and a section line A2-A2'. FIG. 3 is a schematic exploded view of a part of layers of the electromagnetic wave reflectarray in FIG. 1. FIG. 4A to FIG. 4F are schematic top views of antenna electrodes according to some modified embodiments of the disclosure. FIG. 5A is a schematic view of alignment directions of alignment layers in FIG. 2A. FIG. 5B and FIG. 5C are schematic views of alignment directions of alignment layers according to some modified embodiments of the disclosure. For clarity, a first substrate SUB1, a liquid crystal layer LCL, a spacer SP, an alignment layer AL1, and an alignment layer AL2 in FIG. 2A are omitted in FIG. 1. It should be noted that the numbers of antenna electrodes 110, tuning electrodes 120, first wires WR1, and second wires WR2 shown in the drawings are only for exemplification and are not used to limit the disclosure.

With reference to FIG. 1 to FIG. 3, an electromagnetic wave reflectarray 10 includes the first substrate SUB1, a second substrate SUB2, multiple antenna electrodes 110, multiple tuning electrodes 120, multiple first wires WR1, and multiple second wires WR2. The first substrate SUB1 is disposed opposite to the second substrate SUB2. The antenna electrodes 110 are disposed on the first substrate SUB1 and are located on the side of the first substrate SUB1 away from the second substrate SUB2. The tuning electrodes 120 are disposed on the second substrate SUB2 and are located between the first substrate SUB1 and the second substrate SUB2.

In this embodiment, the antenna electrodes 110 may be arranged into multiple rows and multiple columns respectively along a direction D1 and a direction D2. In other words, the antenna electrodes 110 may be arranged on the first substrate SUB1 to form a reflective antenna array. For example, in this embodiment, the direction D1 may be selectively perpendicular to the direction D2, but the disclosure is not limited thereto. The tuning electrodes 120 are respectively disposed in correspondence to these antenna electrodes 110. More specifically, the tuning electrodes 120 respectively overlay and completely cover the orthographic projections of these antenna electrodes 110 on the second substrate SUB2.

In this embodiment, the antenna electrodes 110 only have one size, but the disclosure is not limited thereto. More specifically, each antenna electrode 110 has a width W1 and a width W2 respectively along the direction D1 and the direction D2. The width W1 of each antenna electrode 110 is the same, and the width W2 of each antenna electrode 110 is the same as well. Similarly, the tuning electrodes 120 also only have one size, and the size of each tuning electrode 120 is slightly greater than the size of the corresponding antenna electrode 110, but the disclosure is not limited thereto. In other embodiment, the size of the tuning electrodes and the size of the antenna electrodes may also be approximately the same. However, in another embodiment, the tuning electrodes and the liquid crystal layer may also be disposed only in a partial area having the antenna electrodes to reduce the cost of the electromagnetic wave reflectarray. In other words, the size of the tuning electrodes may be less than the size of the antenna electrodes.

The first wires WR1 are also disposed on the first substrate SUB1. These first wires WR1 are arranged along the direction D1 and extend in the direction D2. The second wires WR2 are also disposed on the second substrate SUB2. These second wires WR2 are arranged along the direction D2 and extend in the direction D1. For example, the antenna electrodes 110 may be arranged into multiple electrode strings 1105 along the direction D2, and these electrode strings 1105 are respectively electrically connected to the first wires WR1. The tuning electrodes 120 may be arranged into multiple electrode strings 120S along the direction D1, and these electrode strings 120S are respectively electrically connected to the second wires WR2.

The electromagnetic wave reflectarray 10 further includes the liquid crystal layer LCL disposed between the first substrate SUB1 and the second substrate SUB2. For example, the spacer SP may be disposed between the first substrate SUB1 and the second substrate SUB2 to form an accommodating space for the liquid crystal layer LCL. Moreover, at least one side of the liquid crystal layer LCL needs to be disposed with an alignment layer for the liquid crystal molecules thereof to be arranged along the alignment direction of the alignment layer when not subject to an electric field, so as to maintain the directivity of the effective optical axis thereof.

In this embodiment, the electromagnetic wave reflectarray 10 may be disposed with two alignment layers AL1 and AL2. The alignment layer AL1 is disposed on the surface of the first substrate SUB1 contacting the liquid crystal layer LCL, while the alignment layer AL2 is disposed on the surfaces of the second substrate SUB2 and the tuning electrodes 120 contacting the liquid crystal layer LCL, but the disclosure is not limited thereto. In another embodiment, one of the alignment layers may also be omitted and not be disposed according to the design or process requirements of the electromagnetic wave reflectarray (e.g., the thickness of the liquid crystal layer LCL). For example, in this embodiment, an alignment direction AD1 of the alignment layer AL1 may be anti-parallel to an alignment direction AD2 of the alignment layer AL2 (as shown in FIG. 5A). Therefore, in the absence of an applied electric field, multiple liquid crystal molecules (not illustrated) of the liquid crystal layer LCL are aligned along the alignment directions of the alignment layers substantially parallel to the two substrates.

On the other hand, the alignment layer of this embodiment may be entirely coated on the substrate, but the disclosure is not limited thereto. In another embodiment, the alignment layer may also be multiple alignment patterns disposed in correspondence to multiple tuning electrodes or multiple antenna electrodes, and the alignment patterns are the same as the profiles of the orthographic projections of both the corresponding tuning electrodes or antenna electrodes on the substrate.

It should be noted that the antenna electrode 110 and the tuning electrode 120 that overlap along a direction D3, as well as the portion of the liquid crystal layer LCL located between these two electrodes may be regarded as one antenna structure of this embodiment. The resonance frequency of electromagnetic waves on the antenna electrode 110 may be adjusted by changing effective dielectric constants of that portion of the liquid crystal layer LCL.

Since the liquid crystal material has dielectric anisotropy, which means the liquid crystal material has different dielectric constants (e.g., a dielectric constant $\in_{//}$ and a dielectric constant $\in\perp$) respectively in a direction parallel to and in a direction perpendicular to the major axis (also called as the molecular axis) of the liquid crystal molecules, the liquid crystal material may be electronically controlled. To change the effective dielectric constants of the liquid crystal layer LCL in the electric field direction of electromagnetic waves, the antenna electrode 110 and the tuning electrode 120 may be respectively applied with different voltages for generating an electric field that may be used to drive multiple liquid crystal molecules of the layer LCL to rotate between the two electrodes. Electric fields of different strengths may cause these liquid crystal molecules to be arranged in different directions (e.g., the direction of the major axis of the molecules), generating different effective dielectric constants in the electric field direction of electromagnetic waves, with the effective dielectric constants falling within the range between the dielectric constant $\in_{//}$ and the dielectric constant $\in\perp$.

For example, in this embodiment, all antenna electrodes 110 have the same first voltage V1, and all tuning electrodes 120 have the same second voltage V2. The first voltage V1 is different from the second voltage V2. In detail, the first wires WR1 electrically connected to the electrode strings 1105 may be selectively electrically connected to a first voltage source 210 to have the first voltage V1, while the second wires WR2 electrically connected to the electrode strings 120S may be selectively electrically connected to a second voltage source 220 to have the second voltage V2.

In other words, in this embodiment, the above method of driving these antenna electrodes 110 and these tuning electrodes 120 may make all the antenna structures generate the same tuning amount for the resonance frequency (i.e., center frequency) of electromagnetic waves. From another point of view, such the driving method may adjust the reflection efficiency of these antenna structures for electromagnetic waves of specific frequencies.

Furthermore, the antenna electrode 110 of the embodiment is, for example, a conductor patch, and the profile of the orthographic projection thereof on the first substrate SUB1 is a square, but the disclosure is not limited thereto. In another embodiment, the profile of the orthographic projection of an antenna electrode 110A on the first substrate SUB1 may be a circle (as shown in FIG. 4A). In order to make electromagnetic waves have different characteristics (e.g., better directivity) after reflected by the antenna structures, the configuration of the antenna electrodes in some embodiments may also be other aspects. For example, the antenna electrode may include multiple conductor patches, and the profile of the orthographic projection of each conductor patch on the first substrate SUB1 may be rectangular, circular, U-shaped, L-shaped, or in other shapes that may lead to a bijection between the phase delay of the reflected signals and the physical size/electrical size (e.g., electrical length) of the electrode.

Figure 4B:
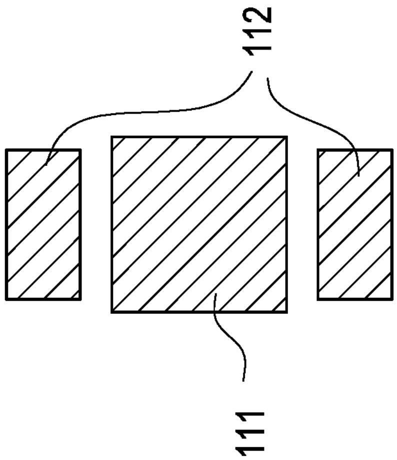
Figure 4A:
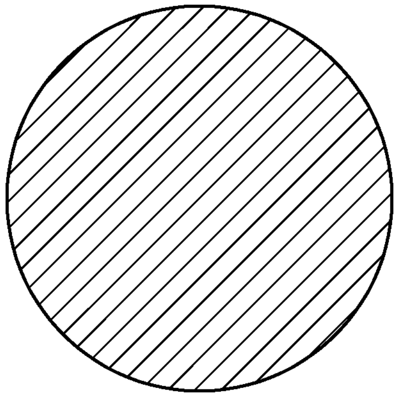
Figure 4F:
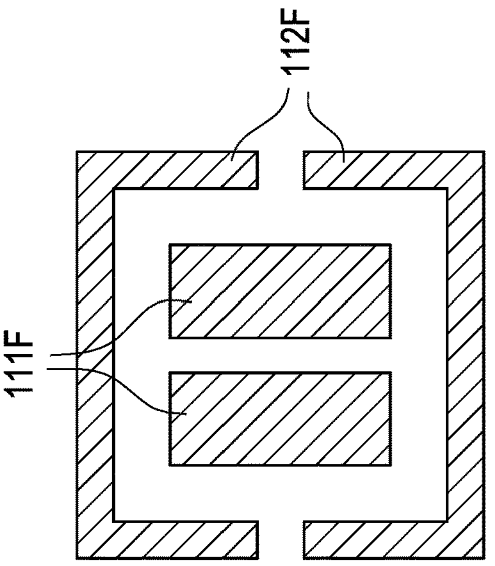
Figure 4E:
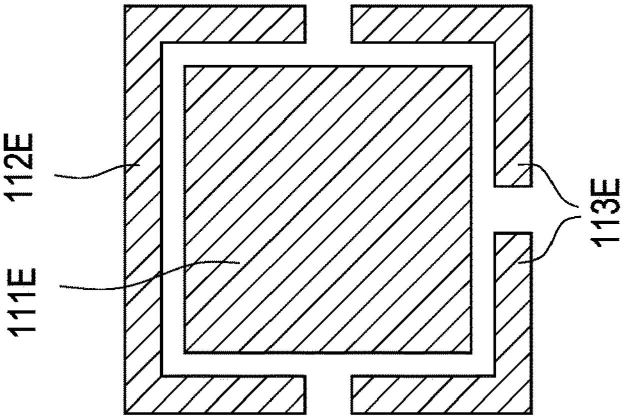
Figure 4D:
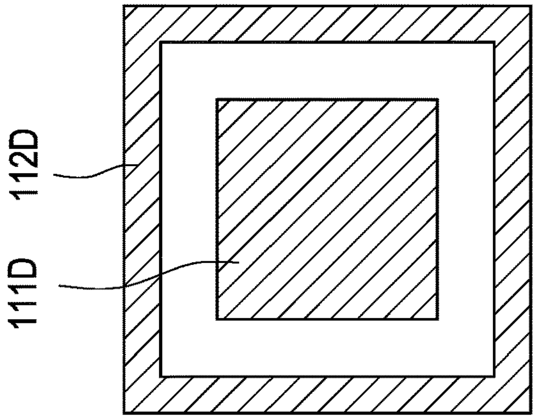
Figure 5C:
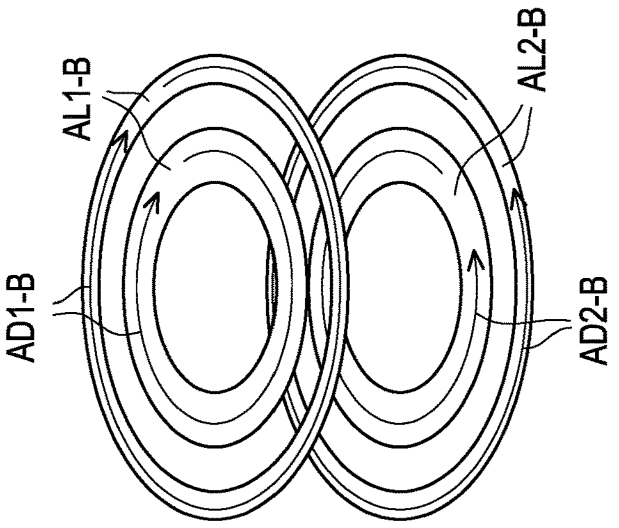
FIG. 5B and FIG. 5C are schematic views of alignment directions of alignment layers according to some modified embodiments of the disclosure.
Figure 5B:
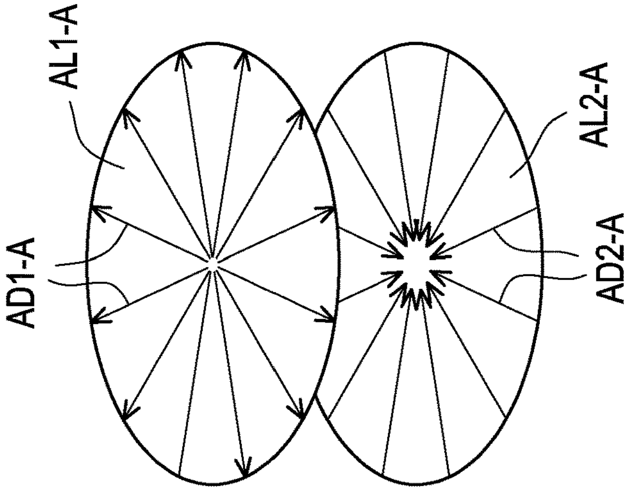
Figure 5A:
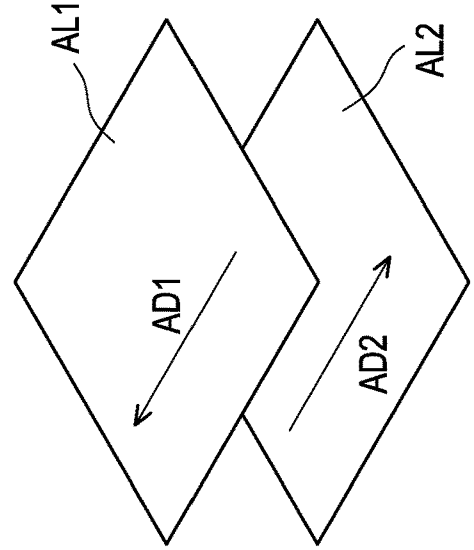
FIG. 5A is a schematic view of alignment directions of alignment layers in FIG. 2A.

For example, the antenna electrode may be composed of one square conductor patch 111 and two rectangular conductor patches 112 arranged at intervals (as shown in FIG. 4B). The antenna electrode may also be composed of two circular conductor patches 111C and 112C arranged concentrically at intervals (as shown in FIG. 4C). The antenna electrode may also be implemented into an aspect where one square conductor patch 111D is surrounded by one square annular conductor patch 112D (as shown in FIG. 4D). The antenna electrode may also be implemented into an aspect where one square conductor patch 111E is surrounded by one U-shaped conductor patch 112E and two L-shaped conductor patches 113E (as shown in FIG. 4E). The antenna electrode may also be implemented into an aspect where two rectangular conductor patches 111F arranged at intervals are surrounded by two U-shaped conductor patches 112F (as shown in FIG. 4F).

On the other hand, in order to adapt the antenna structure to various possible polarization directions of electromagnetic waves, the alignment directions of the aforementioned alignment layers may further be adjusted according to the configuration of the antenna electrode. For example, for the electromagnetic wave reflectarray using the antenna electrode 110A of FIG. 4A, an alignment direction AD1-A of an alignment layer AL1-A and an alignment direction AD2-A of an alignment layer AL2-A may be radial (as shown in FIG. 5B). For the electromagnetic wave reflectarray using an antenna electrode 110C of FIG. 4C, an alignment direction AD1-B of an alignment layer AL1-B and an alignment direction AD2-B of an alignment layer AL2-B may be concentric (as shown in FIG. 5C). It should be noted that the alignment layers in FIG. 5B and FIG. 5C may be composed of multiple alignment patterns whose profiles are similar to the tuning electrode or the antenna electrode, but the disclosure is not limited thereto.

In particular, in consideration of electrical conductivity, conductor patches are generally made of metal materials, but the disclosure is not limited thereto. In order to meet requirements in different usage scenarios, the conductor patches may also be made of transparent conductive materials. The transparent conductive materials include, for example, indium tin oxide, indium zinc oxide, aluminum tin oxide, aluminum zinc oxide, other suitable metal oxides, or a stack layer of at least two of the above. For example, if the antenna electrode is made of transparent conductive materials, the electromagnetic wave reflectarray of the disclosure may be directly integrated into a glass window of a building. In other words, the first substrate SUB1 and the second substrate SUB2 may be ceramic laminates or low dielectric loss substrates (e.g., Rogers substrates), or may be glass substrates.

Other embodiments are described below to explain the disclosure in detail, and the same components will be denoted by the same reference numerals, and the description of the same technical content will be omitted. For the description of the omitted part, reference may be made to the above embodiment, and details are not described in the following embodiments.

Figure 6:
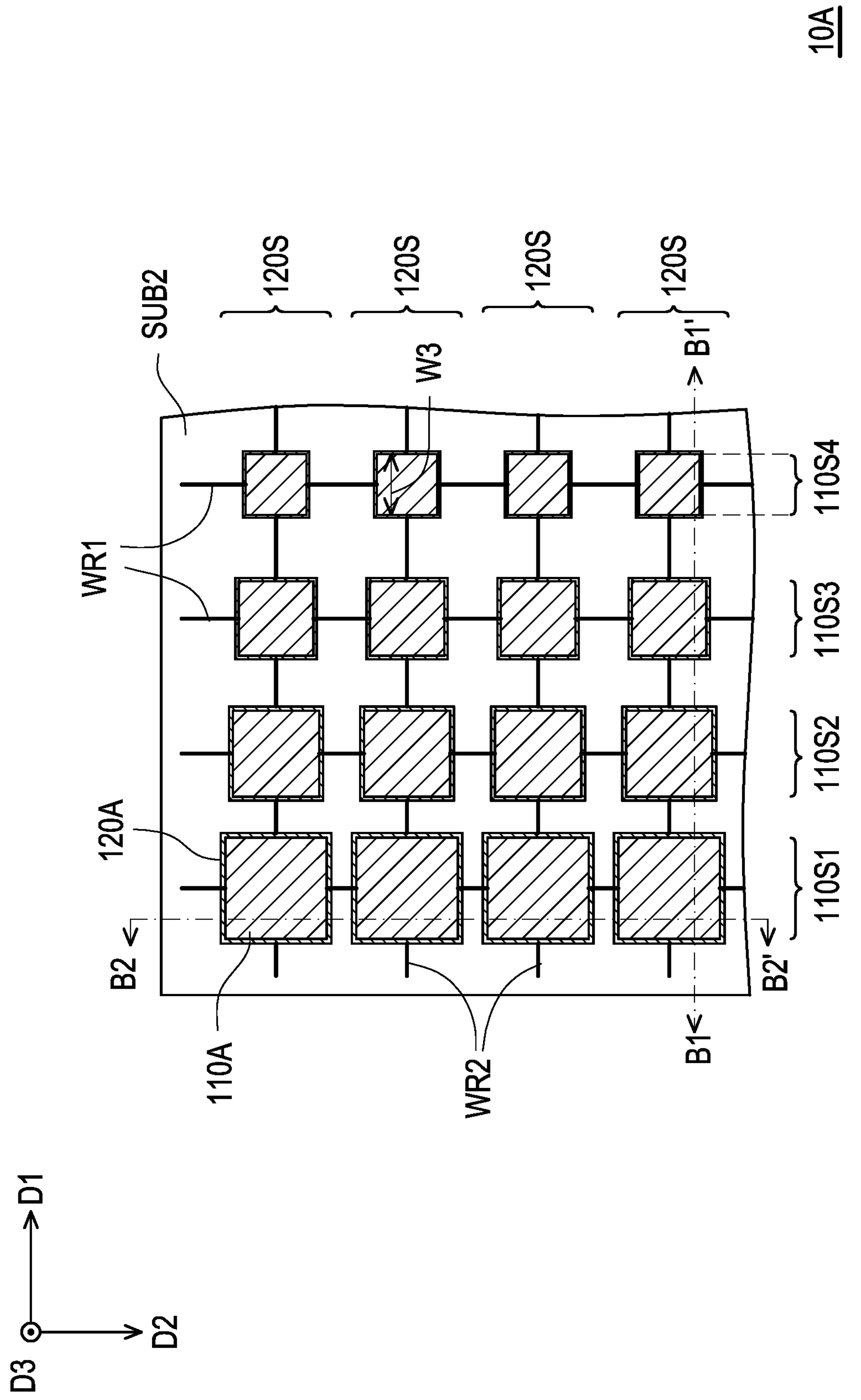
FIG. 6 is a schematic top view of an electromagnetic wave reflectarray according to the second embodiment of the disclosure.
Figure 7A:
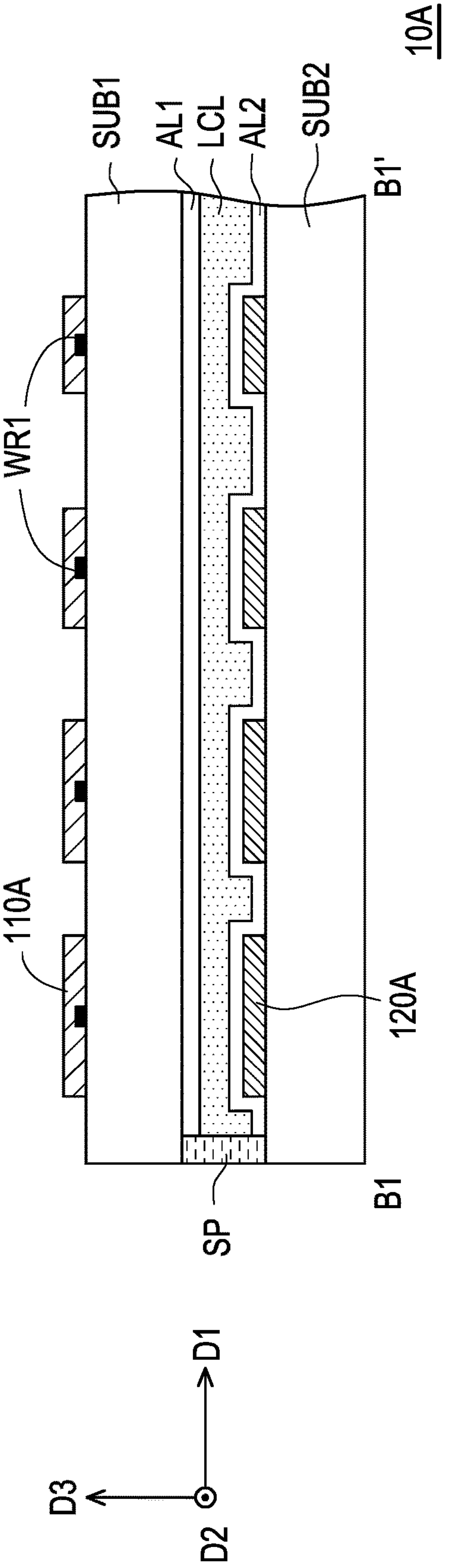
FIG. 7A and FIG. 7B are schematic cross-sectional views of the electromagnetic wave reflectarray in FIG. 6.
Figure 7B:
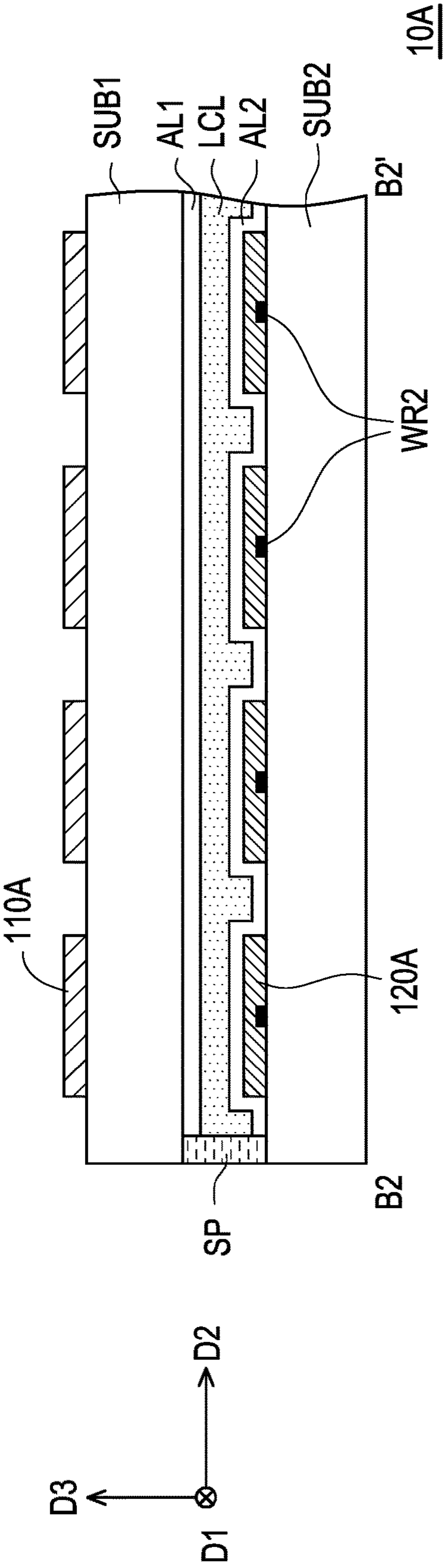

FIG. 6 is a schematic top view of an electromagnetic wave reflectarray according to the second embodiment of the disclosure. FIG. 7A and FIG. 7B are schematic cross-sectional views of the electromagnetic wave reflectarray in FIG. 6 respectively taken alone a section line B1-B1' and a section line B2-B2'. For clarity, the first substrate SUB1, the liquid crystal layer LCL, the spacer SP, the alignment layer AL1, and the alignment layer AL2 in FIG. 7A are omitted in FIG. 6. With reference to FIG. 6 to FIG. 7B, different from the electromagnetic wave reflectarray 10 of FIG. 1, the antenna electrodes 110A and the tuning electrodes 120A of an electromagnetic wave reflectarray 10A of this embodiment have various sizes.

In detail, the antenna electrodes 110A have a width W3 along the arrangement direction (e.g., the direction D1) of the first wires WR1, and the width W3 of the antenna electrodes 110A decreases or increases from one side to the other side in the arrangement direction of these antenna electrodes 110A. For example, in this embodiment, the size of each antenna electrode 110A of an electrode string 11051, an electrode string 110S2, an electrode string 110S3, and an electrode string 110S4 sequentially arranged in the direction D1 decreases from one side disposed with the electrode string 11051 to the other side disposed with the electrode string 110S4 on the second substrate SUB2. Correspondingly, the size of each tuning electrode 120A of the same electrode string 120S also decreases from one side disposed with the electrode string 11051 to the other side disposed with the electrode string 110S4 on the second substrate SUB2.

However, the disclosure is not limited thereto. In another embodiment not illustrated, the size of the antenna electrodes and the size of the tuning electrodes may also decrease or increase along the arrangement direction (e.g., the direction D2) of the second wires WR2. In other words, the size of the antenna electrodes and the size of the tuning electrodes may vary along the direction D1 or the direction D2.

Since the size of the antenna electrodes 110A of this embodiment varies along the direction D1, the phase of electromagnetic waves reflected by these antenna electrodes 110A of different sizes varies as well. That means, with this setting of size, the main emitting direction of electromagnetic waves may be changed after reflected by the electromagnetic wave reflectarray 10A. In addition, by tuning the effective dielectric constants of the liquid crystal layer LCL, the phase of electromagnetic waves reflected by each antenna structure may be individually controlled, and beam scanning may be performed near the aforementioned main emitting direction to increase the electromagnetic wave signal coverage.

Figure 8:
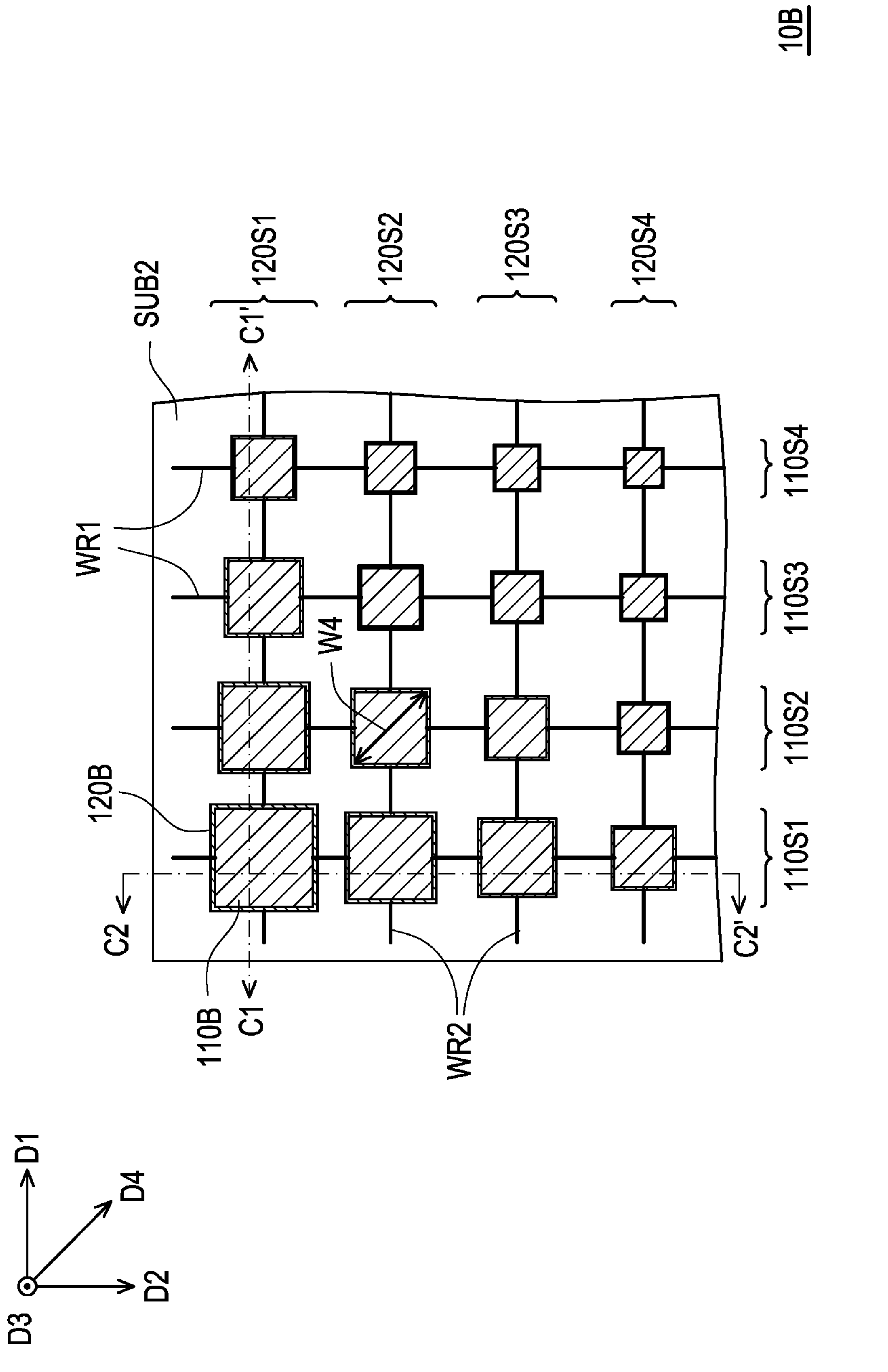
FIG. 8 is a schematic top view of an electromagnetic wave reflectarray according to the third embodiment of the disclosure.
Figure 9A:
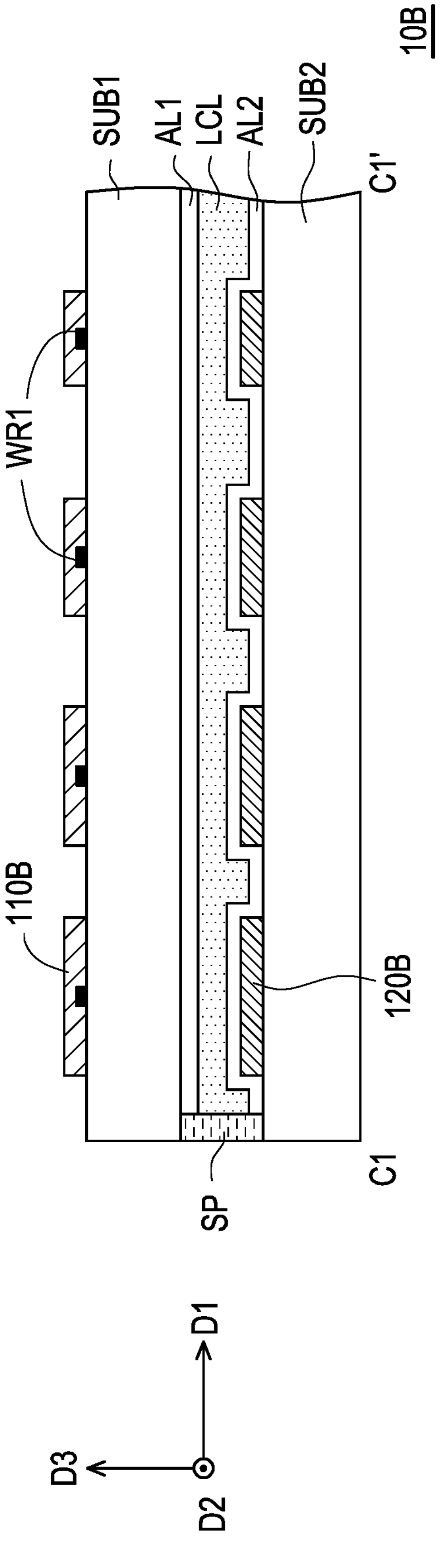
FIG. 9A and FIG. 9B are schematic cross-sectional views of the electromagnetic wave reflectarray in FIG. 8.
Figure 9B:
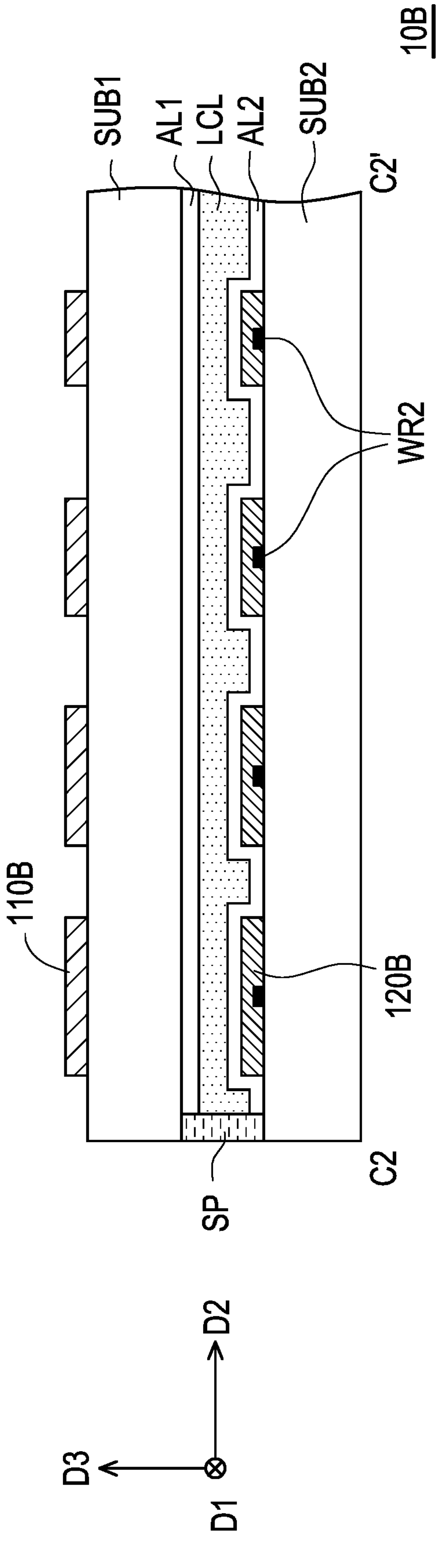

FIG. 8 is a schematic top view of an electromagnetic wave reflectarray according to the third embodiment of the disclosure. FIG. 9A and FIG. 9B are schematic cross-sectional views of the electromagnetic wave reflectarray in FIG. 8 respectively taken alone a section line C1-C1' and a section line C2-C2'. For clarity, the first substrate SUB1, the liquid crystal layer LCL, the spacer SP, the alignment layer AL1, and the alignment layer AL2 in FIG. 9A are omitted in FIG. 8. With reference to FIG. 8 to FIG. 9B, different from the electromagnetic wave reflectarray 10A of FIG. 6, the size of each antenna electrode 110B and the size of each tuning electrode 120B of an electromagnetic wave reflectarray 10B in this embodiment may decrease or increase along multiple directions.

In this embodiment, the size of the antenna electrodes 110B and the size of the tuning electrodes 120B may vary along the direction D2 as well as along the direction D1. For example, the size of each antenna electrode 110B respectively overlapping an electrode string 120S1, an electrode string 120S2, an electrode string 120S3, and an electrode string 120S4 sequentially arranged in the direction D2 decreases from one side disposed with the electrode string 120S1 to the other side disposed with the electrode string 120S4 on the second substrate SUB2. Therefore, the size of the antenna electrodes 110B in this embodiment varies in a direction not parallel to the direction D1 and the direction D2 (e.g., a width W4 of the antenna electrodes 110B varies in a direction D4) more obviously than the electromagnetic wave reflectarray 10A of FIG. 6.

Since the size of the antenna electrodes 110A in this embodiment varies along the direction D1, the phase of electromagnetic waves reflected by these antenna electrodes 110A of different sizes varies as well. That is to say, with this setting of size, the main emitting direction of electromagnetic waves may be changed after reflected by the electromagnetic wave reflectarray 10B. On the other hand, by tuning the effective dielectric constants of the liquid crystal layer LCL, the phase of electromagnetic waves reflected by each antenna structure may be individually controlled, such that the emitting direction may be adjusted within a specific angle range near the aforementioned preset emitting direction, thereby achieving the adjustment of the electromagnetic wave signal coverage.

Figure 10:
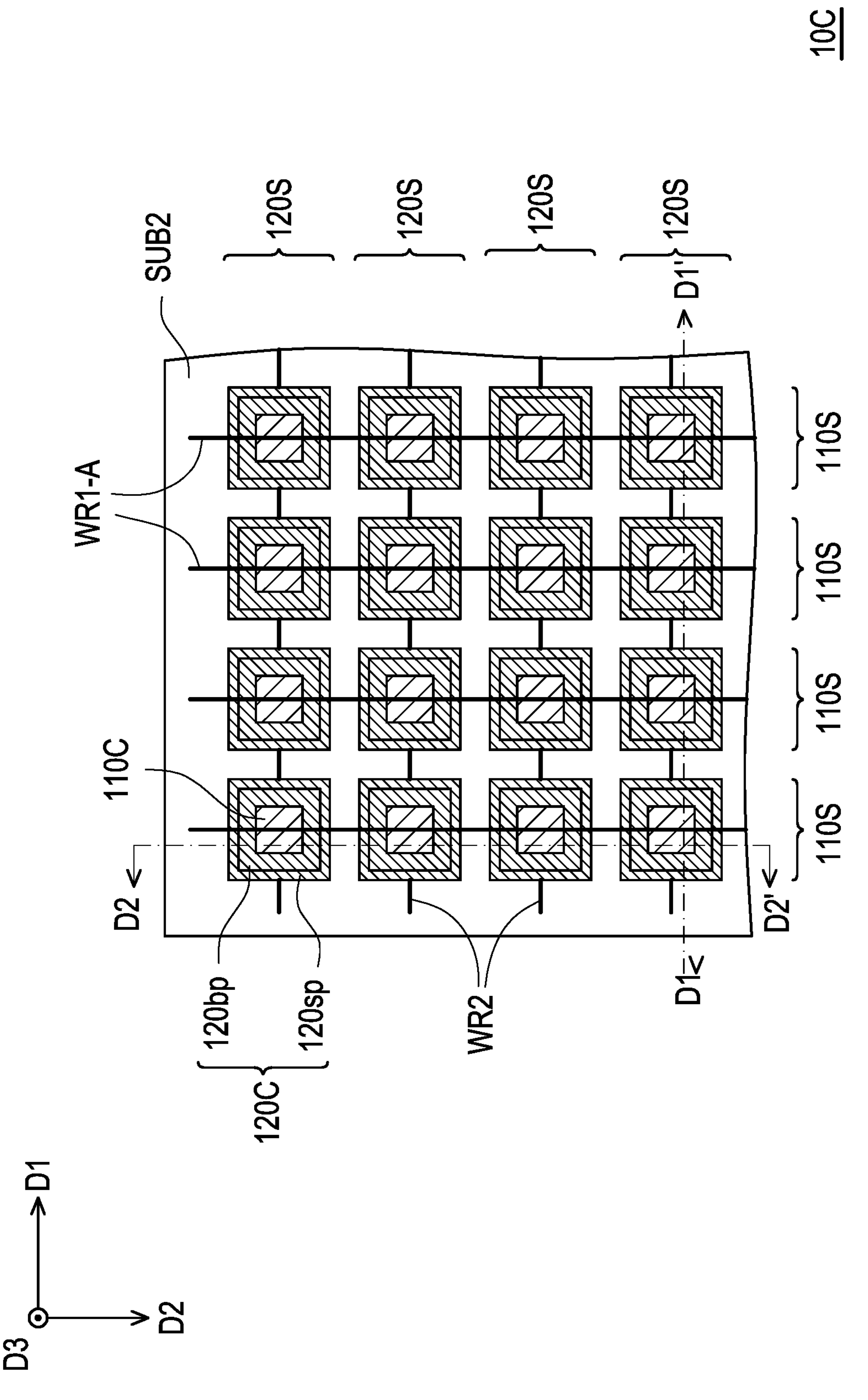
FIG. 10 is a schematic top view of an electromagnetic wave reflectarray according to the fourth embodiment of the disclosure.
Figure 11A:
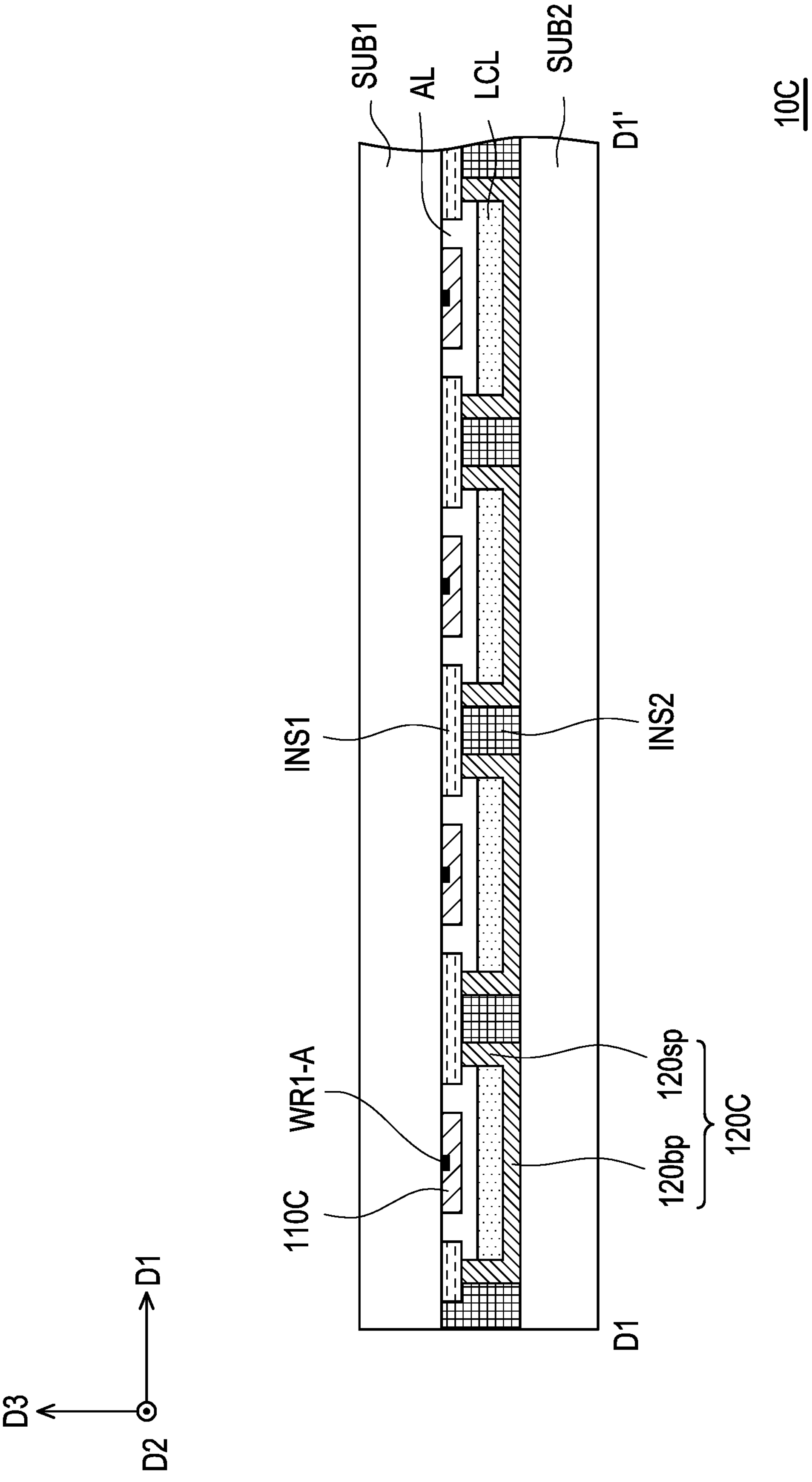
FIG. 11A and FIG. 11B are schematic cross-sectional views of the electromagnetic wave reflectarray in FIG. 10.
Figure 11B:
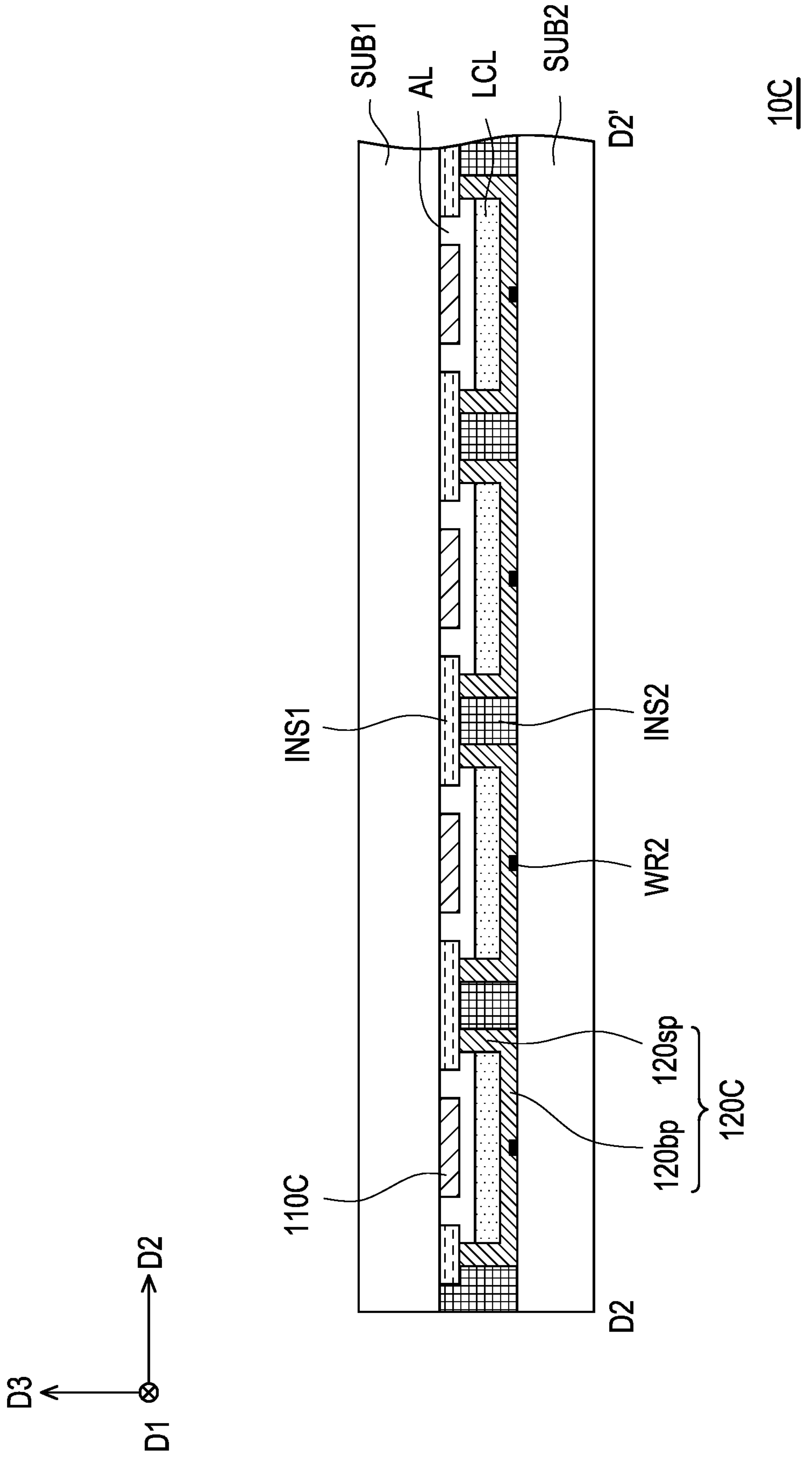

FIG. 10 is a schematic top view of an electromagnetic wave reflectarray according to the fourth embodiment of the disclosure. FIG. 11A and FIG. 11B are schematic cross-sectional views of the electromagnetic wave reflectarray in FIG. 10 respectively taken alone a section line D1-D1' and a section line D2-D2'. For clarity, the first substrate SUB1, the liquid crystal layer LCL, the spacer SP, an alignment layer AL, an insulating layer INS1, and an insulating layer INS2 in FIG. 11A are omitted in FIG. 10. With reference to FIG. 10 to FIG. 11B, an electromagnetic wave reflectarray 10C of this embodiment and the electromagnetic wave reflectarray 10 of FIG. 1 are mainly different in the configuration of the tuning electrodes.

In this embodiment, antenna electrodes 110C and first wires WR1-A are disposed on a lateral surface of the first substrate SUB1 facing the second substrate SUB2 instead, and the liquid crystal layer LCL may be divided into multiple portions separated from each other. A tuning electrode 120C has a bottom portion 120*bp* parallel to the second substrate SUB2 and a sidewall portion 120*sp* bendably extending from the bottom 120*bp*, and the sidewall portion 120*sp* surrounds the antenna electrode 110C and a portion of the liquid crystal layer LCL.

Since the sidewall portion 120*sp* of each tuning electrode 120C may effectively reduce the influence on the portion of the liquid crystal layer LCL surrounded thereby from the external electric field generated by the adjacent antenna electrode 110C and another tuning electrode 120C, the equivalent electron size of each antenna electrode 110C on electromagnetic waves may be controlled in a favorable way. Therefore, these antenna structures may be arranged more closely, which makes the difference in equivalent electron size between any two adjacent antenna electrodes 110C greater, thereby achieving the effect of multiple ripples of the reflected electromagnetic waves.

It should be noted that, based on process considerations and thickness design of the liquid crystal layer LCL, the electromagnetic wave reflectarray 10C of this embodiment is disposed with the alignment layer AL only on the surface of the first substrate SUB1 contacting the liquid crystal layer LCL. Moreover, in order to ensure electrical separation between the first wire WR1-A and the tuning electrode 120C, the insulating layer INS1 is further disposed between the tuning electrode 120C and the first substrate SUB1, and the insulating layer INS1 covers the first wire WR1-A. The insulating layer INS2 may be disposed between any two adjacent tuning electrodes 120C for electrical separation from each other.

It should be noted that, in another modified aspect of this embodiment, the antenna electrode 110C may also be disposed on a lateral surface of the first substrate SUB1 away from the second substrate SUB2 as the antenna electrode 110 does in FIG. 2A.

Figure 12:
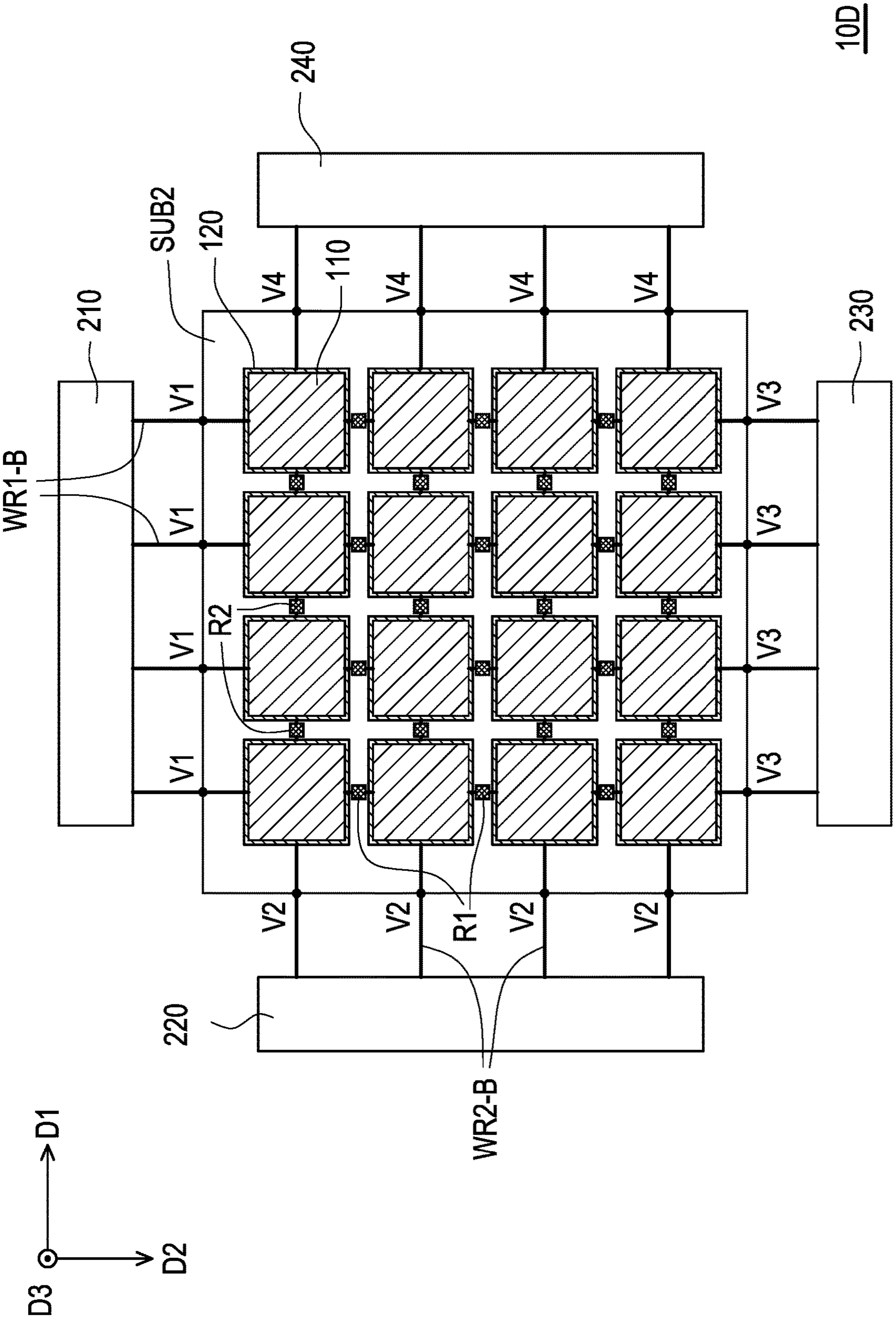
FIG. 12 is a schematic top view of an electromagnetic wave reflectarray according to the fifth embodiment of the disclosure.

FIG. 12 is a schematic top view of an electromagnetic wave reflectarray according to the fifth embodiment of the disclosure. With reference to FIG. 12, an electromagnetic wave reflectarray 10D of this embodiment and the electromagnetic wave reflectarray 10 of FIG. 1 are different only in that the antenna electrodes and the tuning electrodes are driven differently. Specifically, in the electromagnetic wave reflectarray 10D, each first wires WR1-B has multiple first resistors R1, and each second wires WR2-B has multiple second resistors R2.

It should be noted that each first resistors R1 is electrically connected to any two antenna electrodes 110 in the corresponding electrode string, and each second resistor R2 is electrically connected to any two tuning electrodes 120 in the corresponding electrode string. In addition, different from the electromagnetic wave reflectarray 10 of FIG. 1, two opposite ends of the first wire WR1-B of the embodiment are respectively electrically connected to the first voltage source 210 and a third voltage source 230 to have the first voltage V1 and a third voltage V3, while two opposite ends of the second wire WR2-B are respectively electrically connected to the second voltage source 220 and a fourth voltage source 240 to have the second voltage V2 and a fourth voltage V4.

The antenna electrodes 110 electrically connected to the same first wire WR1-B may have different voltages through being disposed with the first resistors R1, while the tuning electrodes 120 electrically connected to the same second wire WR2-B may have different voltages through being disposed with the second resistors R2. accordingly, the operation flexibility of these electrodes may be increased, and the reflection phase of electromagnetic waves of each antenna structure may be individually controlled, thereby changing the emitting direction of the electromagnetic waves reflected by the antenna structures.

For example, the first voltage V1 may be greater than the third voltage V3, and the first resistors R1 serially connected on the same first wire WR1-B have the same resistance value. Therefore, the voltage of each antenna electrode 110 of the same electrode string decreases from a side of the first voltage source 210 to a side of the third voltage source 230, and the voltage difference between any two adjacent antenna electrodes 110 is (V3-V1)/N, where N is the number of the first resistors R1 serially connected on the first wire WR1-B (e.g., three in this embodiment).

Similarly, the second voltage V2 may be greater than the fourth voltage V4, and the second resistors R2 serially connected on the same second wire WR2-B have the same resistance value. Therefore, the voltage of each tuning electrode 120 of the same electrode string decreases from a side of the second voltage source 220 to a side of the fourth voltage source 240, and the voltage difference between any two adjacent tuning electrodes 120 is (V4-V2)/M, where M is the number of the second resistors R2 serially connected on the second wire WR2-B (e.g., three in this embodiment).

In this embodiment, the first resistor R1 and the second resistor R2 may be resistors with fixed resistance values, but the disclosure is not limited thereto. In another embodiment not illustrated, the resistor on the wire may also be a variable resistor with an adjustable resistance value, and multiple variable resistors may be electrically coupled to a control circuit. The control circuit may determine the resistance values of these variable resistors according to the required reflection phase distribution of those multiple antenna structures.

Figure 13:
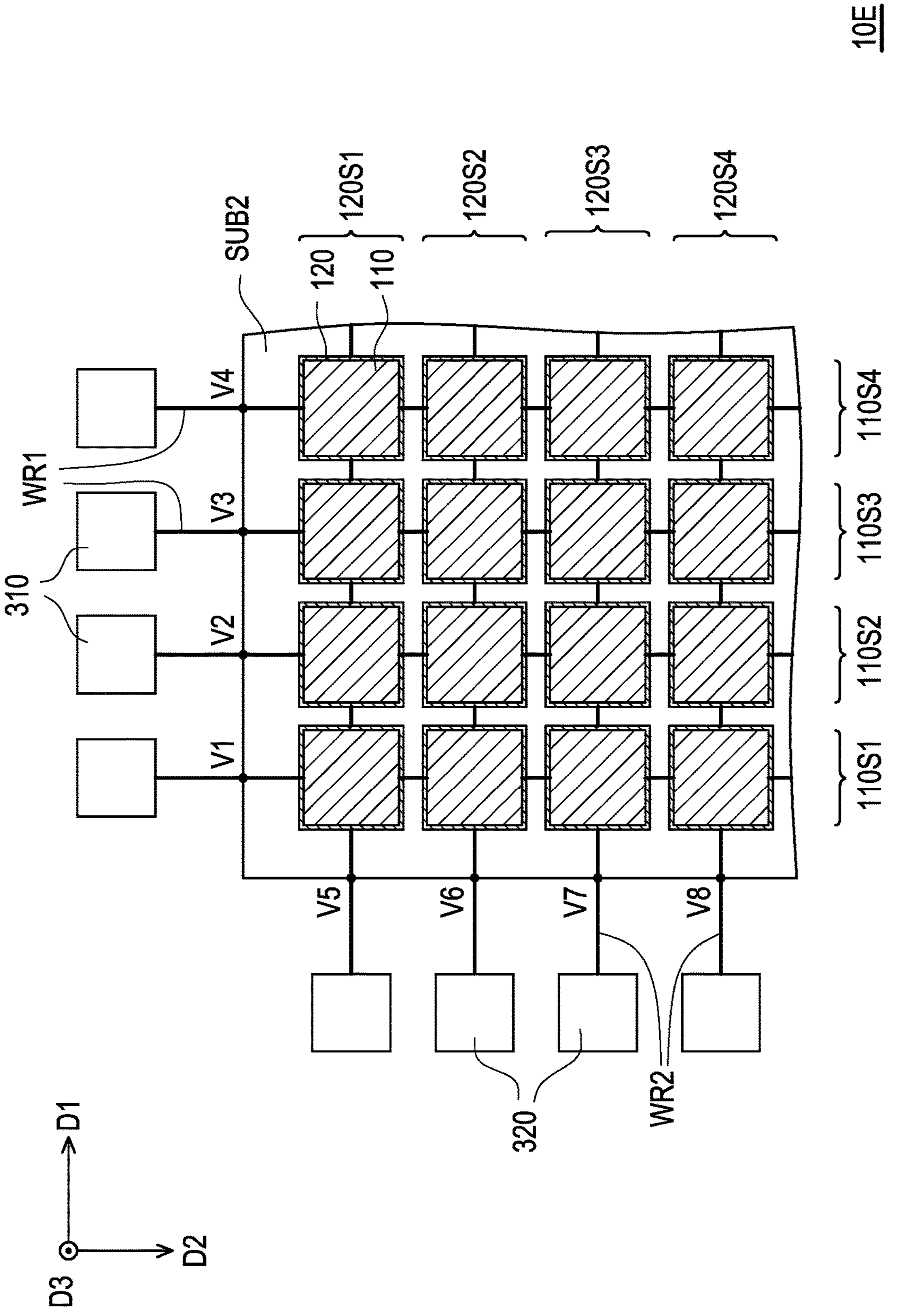
FIG. 13 is a schematic top view of an electromagnetic wave reflectarray according to the sixth embodiment of the disclosure.

FIG. 13 is a schematic top view of an electromagnetic wave reflectarray according to the sixth embodiment of the disclosure. With reference to FIG. 13, an electromagnetic wave reflectarray 10E of this embodiment and the electromagnetic wave reflectarray 10 of FIG. 1 are different in that the antenna electrodes and the tuning electrodes are driven differently. In this embodiment, the electromagnetic wave reflectarray 10E may individually control the voltages of the first wires WR1 and the second wires WR2. More specifically, the voltage of each wire may be controlled by one corresponding digital-to-analog converter. Therefore, the operation flexibility of the antenna electrodes 110 and the tuning electrodes 120 electrically connected to these wires may be increased, and the reflection phase of electromagnetic waves of each antenna structure may be individually controlled, thereby changing the emitting direction of the electromagnetic waves reflected by the antenna structures.

In detail, the first wires WR1 may be electrically connected to a first digital-to-analog converter (DAC) array formed by multiple digital-to-analog converters 310, and the voltage of each first wire WR1 increases or decreases from one side to the other side of the first wires WR1 in the arrangement direction (e.g., the direction DD. For example, four first wires WR1 (or four electrode strings 11051 to 110S4) sequentially arranged along the direction D1 are electrically connected to multiple digital-to-analog converters 310 to respectively have the first voltage V1, the second voltage V2, the third voltage V3, and the fourth voltage V4, and these voltages may increase (or decrease) unidirectionally along the direction D1 with equal or unequal differences.

Similarly, the second wires WR2 may be electrically connected to a second digital-to-analog converter array formed by multiple digital-to-analog converters 320, and the voltage of each second wire WR2 increases or decreases from one side to the other side of the second wires WR2 in the arrangement direction (e.g., the direction D2). For example, four second wires WR2 (or four electrode strings 120S1 to 120S4) sequentially arranged along the direction D2 are electrically connected to multiple digital-to-analog converters 320 to respectively have a fifth voltage V5, a sixth voltage V6, a seventh voltage V7, and an eighth voltage V8, and these voltages may increase (or decrease) unidirectionally along the direction D2 with equal or unequal differences.

It should be noted that the methods of driving electrodes disclosed in FIG. 1, FIG. 12, and FIG. 13 may all be applied to the electromagnetic wave reflectarray in other aspects. Therefore, voltage sources, resistors, or digital-to-analog converters are not illustrated in some embodiments of the disclosure.

Figure 14:
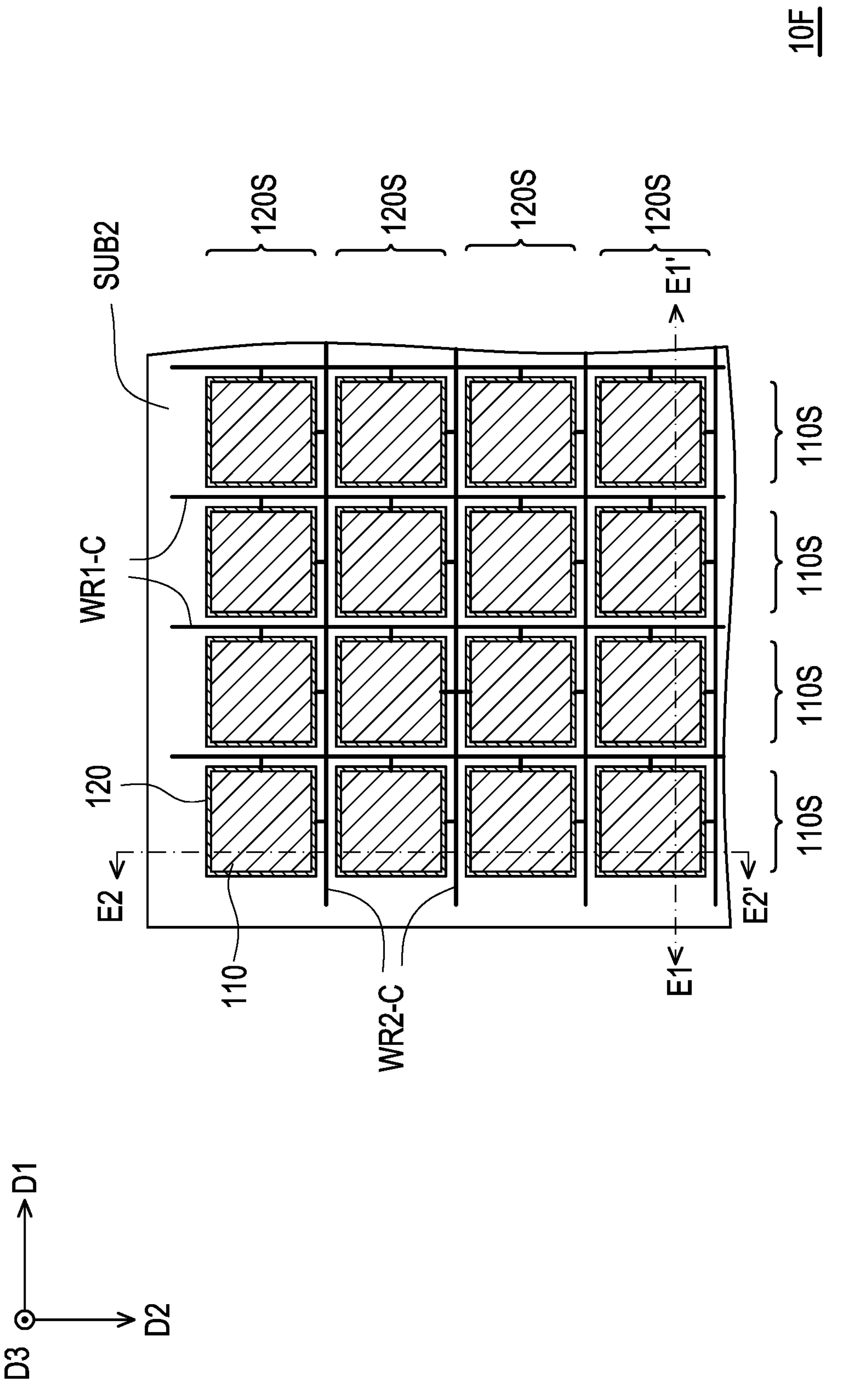
FIG. 14 is a schematic top view of an electromagnetic wave reflectarray according to the seventh embodiment of the disclosure.
Figure 15A:
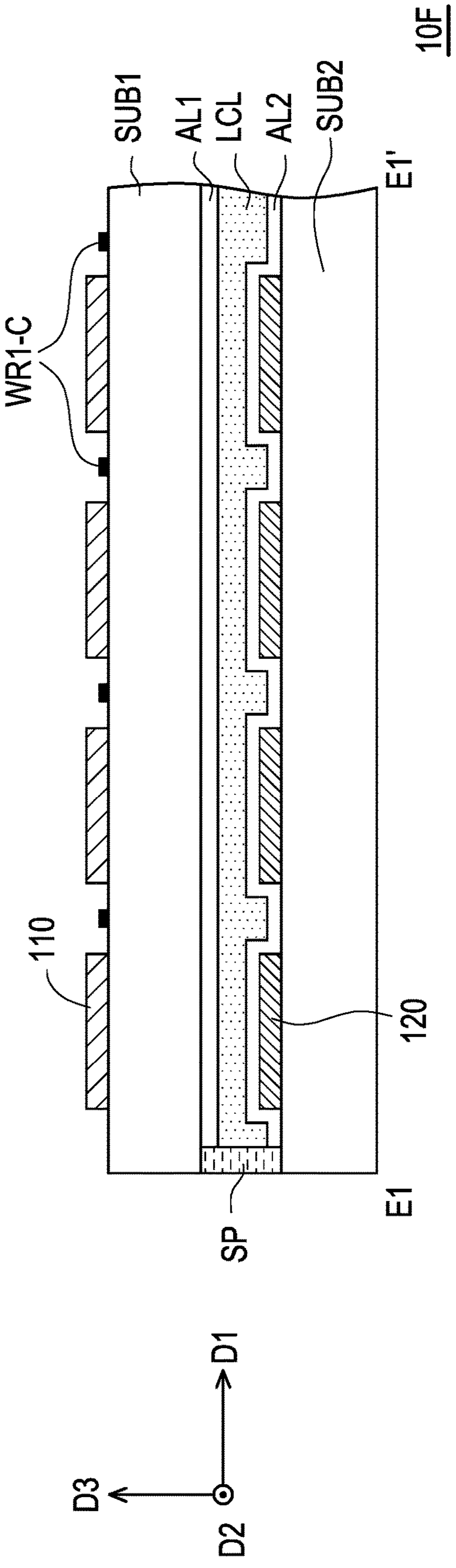
FIG. 15A and FIG. 15B are schematic cross-sectional views of the electromagnetic wave reflectarray in FIG. 14.
Figure 15B:
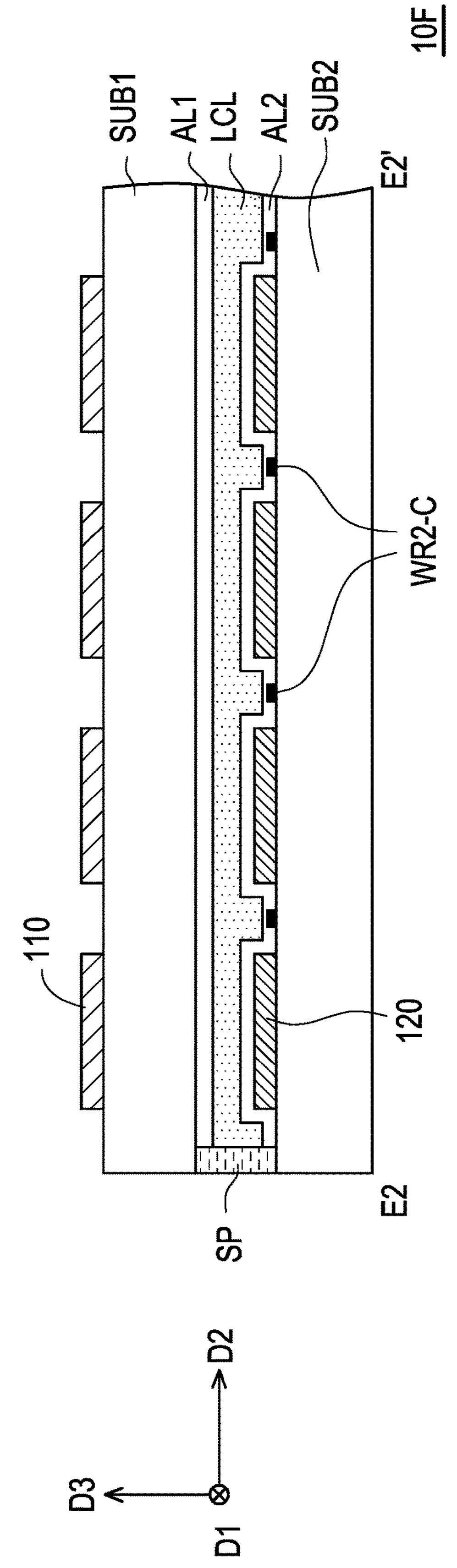

FIG. 14 is a schematic top view of an electromagnetic wave reflectarray according to the seventh embodiment of the disclosure. FIG. 15A and FIG. 15B are schematic cross-sectional views of the electromagnetic wave reflectarray in FIG. 14 respectively taken alone a section line E1-E1' and a section line E2-E2'. With reference to FIG. 14 to FIG. 15B, an electromagnetic wave reflectarray 10F of this embodiment and the electromagnetic wave reflectarray 10 of FIG. 1 are different only in that the wires are configured differently. In this embodiment, wires of the electromagnetic wave reflectarray 10F are disposed between multiple electrodes without overlapping these electrodes along the direction D3.

For example, the first wires WR1-B electrically connected to the electrode strings 1105 may be respectively disposed on one side (e.g., the right side in FIG. 14) of the electrode strings 1105 in the arrangement direction, and the second wires WR2-B electrically connected to the electrode strings 120S may be respectively disposed on one side (e.g., the lower side in FIG. 14) of the electrode strings 120S in the arrangement direction. More specifically, the first wires WR1-B and the electrode strings 1105 may be alternately arranged along the direction D1, while the second wires WR2-B and the electrode strings 120S may be alternately arranged along the direction D2.

Figure 16:
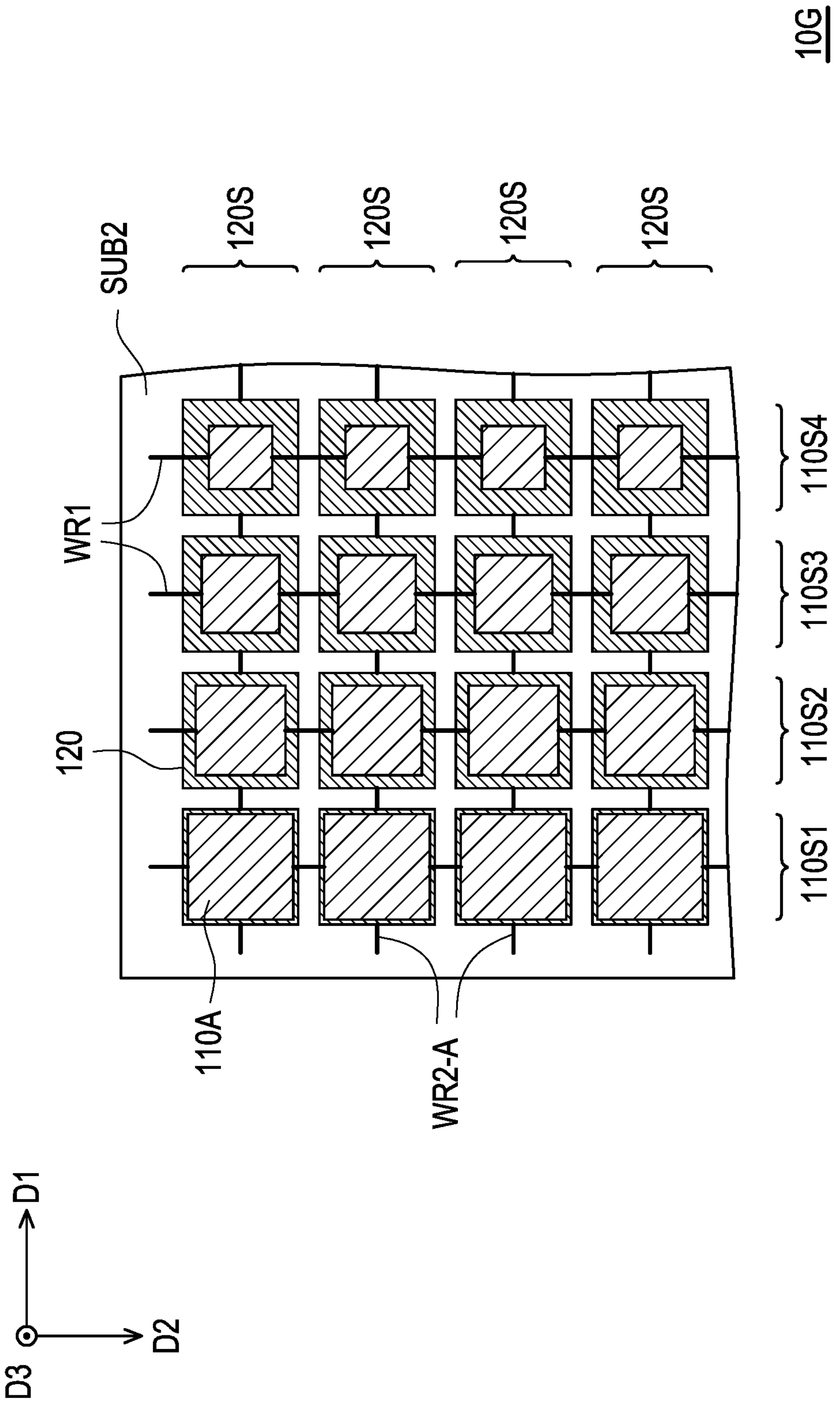
FIG. 16 is a schematic top view of an electromagnetic wave reflectarray according to the eighth embodiment of the disclosure.

FIG. 16 is a schematic top view of an electromagnetic wave reflectarray according to the eighth embodiment of the disclosure. With reference to FIG. 16, an electromagnetic wave reflectarray 10G of this embodiment and the electromagnetic wave reflectarray 10A of FIG. 6 are different in that the tuning electrode are configured differently. Specifically, the antenna electrodes 110A may be arranged in the same way where the size of the antenna electrodes 110A varies as in FIG. 6, but the size of the tuning electrodes 120 is not adjusted in correspondence to the antenna electrodes 110A of different sizes. For example, in this embodiment, these tuning electrodes 120 have only one size, which is all greater than the size of each antenna electrode 110A.

In summary, in the electromagnetic wave reflectarray of an embodiment of the disclosure, each of the antenna structures arranged in an array has the antenna electrode, the tuning electrode, and the liquid crystal layer located between the two electrodes. By adjusting the effective dielectric constant distribution of the liquid crystal layer in these antenna structures, the radiation pattern or reflection efficiency of electromagnetic waves after reflected by these antenna structures may be changed.

What is claimed is:

1. An electromagnetic wave reflectarray, comprising:

a first substrate;

a second substrate, disposed opposite to the first substrate;

a plurality of first wires, separately arranged on the first substrate along a first direction and extending in a second direction, the first direction intersecting with the second direction;

a plurality of second wires, separately arranged on the second substrate along the second direction and extending in the first direction;

a plurality of antenna electrodes, disposed on the first substrate, and the plurality of antenna electrodes are respectively electrically connected to the plurality of first wires to form a plurality of first electrode strings along the second direction;

a plurality of tuning electrodes, disposed on the second substrate and respectively overlaying and completely covering orthographic projections of the plurality of antenna electrodes on the second substrate, and the plurality of tuning electrodes are respectively electrically connected to the plurality of second wires to form a plurality of second electrode strings along the first direction; and a liquid crystal layer, disposed between the first substrate and the second substrate, wherein the plurality of first wires are electrically connected to a first voltage source to have a first voltage, and the plurality of second wires are electrically connected to a second voltage source to have a second voltage.

2. The electromagnetic wave reflectarray according to claim 1, wherein each of the plurality of first wires has a plurality of first resistors located between the plurality of antenna electrodes, and the plurality of first resistors are respectively electrically connected to any two of the plurality of antenna electrodes in one of the plurality of first electrode strings.

3. The electromagnetic wave reflectarray according to claim 2, wherein each of the plurality of second wires has a plurality of second resistors located between the plurality of antenna electrodes, and the plurality of second resistors are respectively electrically connected to any two of the plurality of tuning electrodes in one of the plurality of second electrode strings.

4. The electromagnetic wave reflectarray according to claim 1, wherein each of the plurality of antenna electrodes has a first width and a second width respectively along the first direction and the second direction, the first width of each of the plurality of antenna electrodes is the same, and the second width of each of the plurality of antenna electrodes is the same.

5. The electromagnetic wave reflectarray according to claim 1, wherein a width of each of the plurality of antenna electrodes along a third direction increases or decreases from a side to another side of the plurality of antenna electrodes in the third direction.

6. The electromagnetic wave reflectarray according to claim 5, wherein the third direction is parallel to one of the first direction and the second direction.

7. The electromagnetic wave reflectarray according to claim 5, wherein a width of each of the plurality of antenna electrodes along a fourth direction increases or decreases from a side to another side of the plurality of antenna electrodes in the fourth direction, and the fourth direction is not parallel to the first direction and the second direction.

8. The electromagnetic wave reflectarray according to claim 5, wherein a width of each of the plurality of tuning electrodes along the third direction is the same.

9. The electromagnetic wave reflectarray according to claim 1, wherein each of the plurality of antenna electrodes includes at least one conductor patch, and a profile of an orthographic projection of the at least one conductor patch on the first substrate is circular, rectangular, annular, U-shaped, or L-shaped.

10. The electromagnetic wave reflectarray according to claim 1, wherein an orthographic projection of each of the plurality of antenna electrodes on the second substrate is completely covered by an orthographic projection of one of the plurality of tuning electrodes on the second substrate.

11. The electromagnetic wave reflectarray according to claim 1, further comprising:

at least one alignment layer, disposed between the liquid crystal layer and at least one of the first substrate and the second substrate.

12. The electromagnetic wave reflectarray according to claim 11, wherein the at least one alignment layer is a plurality of alignment patterns disposed in correspondence to the plurality of tuning electrodes, and profiles of orthographic projections of each of the plurality of alignment patterns and each of the plurality of tuning electrodes on the first substrate are the same.

13. The electromagnetic wave reflectarray according to claim 12, wherein an alignment direction of each of the plurality of alignment patterns is radial or concentric.

14. A electromagnetic wave reflectarray, comprising:

a first substrate;

a second substrate, disposed opposite to the first substrate;

a plurality of first wires, separately arranged on the first substrate along a first direction and extending in a second direction, the first direction intersecting with the second direction;

a plurality of second wires, separately arranged on the second substrate along the second direction and extending in the first direction;

a plurality of antenna electrodes, disposed on the first substrate, and the plurality of antenna electrodes are respectively electrically connected to the plurality of first wires to form a plurality of first electrode strings along the second direction;

a plurality of tuning electrodes, disposed on the second substrate and respectively overlaying and completely covering orthographic projections of the plurality of antenna electrodes on the second substrate, and the plurality of tuning electrodes are respectively electrically connected to the plurality of second wires to form a plurality of second electrode strings along the first direction; and a liquid crystal layer, disposed between the first substrate and the second substrate, wherein each of the plurality of tuning electrodes has a bottom portion parallel to the second substrate and a sidewall portion bendably extending from the bottom portion, the liquid crystal layer is divided into a plurality of portions separated from each other, and the sidewall portion of each of the plurality of tuning electrodes surrounds one of the plurality of portions of the liquid crystal layer and one of the plurality of antenna electrodes.

15. The electromagnetic wave reflectarray according to claim 14, wherein the plurality of first wires are electrically connected to a first voltage source to have a first voltage, and the plurality of second wires are electrically connected to a second voltage source to have a second voltage.

16. The electromagnetic wave reflectarray according to claim 15, wherein each of the plurality of first wires has a plurality of first resistors located between the plurality of antenna electrodes, and the plurality of first resistors are respectively electrically connected to any two of the plurality of antenna electrodes in one of the plurality of first electrode strings.

17. The electromagnetic wave reflectarray according to claim 16, wherein each of the plurality of second wires has a plurality of second resistors located between the plurality of antenna electrodes, and the plurality of second resistors are respectively electrically connected to any two of the plurality of tuning electrodes in one of the plurality of second electrode strings.

18. The electromagnetic wave reflectarray according to claim 14, wherein each of the plurality of antenna electrodes has a first width and a second width respectively along the first direction and the second direction, the first width of each of the plurality of antenna electrodes is the same, and the second width of each of the plurality of antenna electrodes is the same.

19. The electromagnetic wave reflectarray according to claim 14, wherein each of the plurality of antenna electrodes includes at least one conductor patch, and a profile of an orthographic projection of the at least one conductor patch on the first substrate is circular, rectangular, annular, U-shaped, or L-shaped.

20. The electromagnetic wave reflectarray according to claim 14, wherein an orthographic projection of each of the plurality of antenna electrodes on the second substrate is completely covered by an orthographic projection of one of the plurality of tuning electrodes on the second substrate.

21. The electromagnetic wave reflectarray according to claim 14, further comprising:

at least one alignment layer, disposed between the liquid crystal layer and at least one of the first substrate and the second substrate.

22. The electromagnetic wave reflectarray according to claim 21, wherein the at least one alignment layer is a plurality of alignment patterns disposed in correspondence to the plurality of tuning electrodes, and profiles of orthographic projections of each of the plurality of alignment patterns and each of the plurality of tuning electrodes on the first substrate are the same.

23. The electromagnetic wave reflectarray according to claim 22, wherein an alignment direction of each of the plurality of alignment patterns is radial or concentric.

* * * * *